(12) United States Patent
Zhu

(10) Patent No.: US 11,362,989 B2
(45) Date of Patent: Jun. 14, 2022

(54) RAPID DUPLICATE IP ADDRESS DETECTION FOR FLOATING IP ADDRESS CROSSING MULTIPLE CLUSTER BROADCAST DOMAINS

(71) Applicant: ORACLE INTERNATIONAL CORPORATION, Redwood Shores, CA (US)

(72) Inventor: Ming Zhu, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/859,987

(22) Filed: Apr. 27, 2020

(65) Prior Publication Data

US 2021/0336922 A1  Oct. 28, 2021

(51) Int. Cl.
*H04L 29/12* (2006.01)
*H04L 29/06* (2006.01)
*H04L 61/5007* (2022.01)

(52) U.S. Cl.
CPC ............... *H04L 61/2007* (2013.01)

(58) Field of Classification Search
CPC ............. H04L 61/2007; H04L 61/1511; H04L 61/103; H04L 67/02
See application file for complete search history.

(56) References Cited

U.S. PATENT DOCUMENTS

| 2008/0250123 | A1* | 10/2008 | Chae ............. H04L 61/2046 709/220 |
| 2010/0274924 | A1* | 10/2010 | Allan .............. H04L 29/12839 709/245 |
| 2016/0197876 | A1* | 7/2016 | Bui ................ H04L 61/103 370/392 |
| 2016/0198501 | A1* | 7/2016 | Verkaik ........... H04W 8/04 370/329 |
| 2019/0364070 | A1* | 11/2019 | Zini ............... H04L 63/1425 |

FOREIGN PATENT DOCUMENTS

CN  104065762 A  *  9/2014

OTHER PUBLICATIONS

Harmoush, E., "Gratuitous ARP", Practical Networking, (Feb. 2017).
Harmoush, E., "Traditional ARP", Practical Networking, (Jan. 9, 2017), publication date unknown; date retrieved from google.
"Transmission of GARP Packets Overview", Juniper Networks, Tech Library, (Aug. 13, 2014).
Cheshire, S., "IPv4 Address Conflict Detection", Apple, Inc., (Jul. 2008).
Carlson, J., "Solaris IP Duplicate Address Detection", version 1.6, Sun Microsystems, Inc., (Mar. 1, 2006).
Song, G et al., "Novel Duplicate Address Detection with Hash Function", Plos One, (Mar. 18, 2016).

* cited by examiner

*Primary Examiner* — Christopher B Robinson
(74) *Attorney, Agent, or Firm* — Vista IP Law Group, LLP

(57) ABSTRACT

Described is an improved approach to detect conflicts for the assignment of addresses in a computing system. The improved approach implements identification of address conflicts across multiple broadcast domains in a computing system.

21 Claims, 19 Drawing Sheets

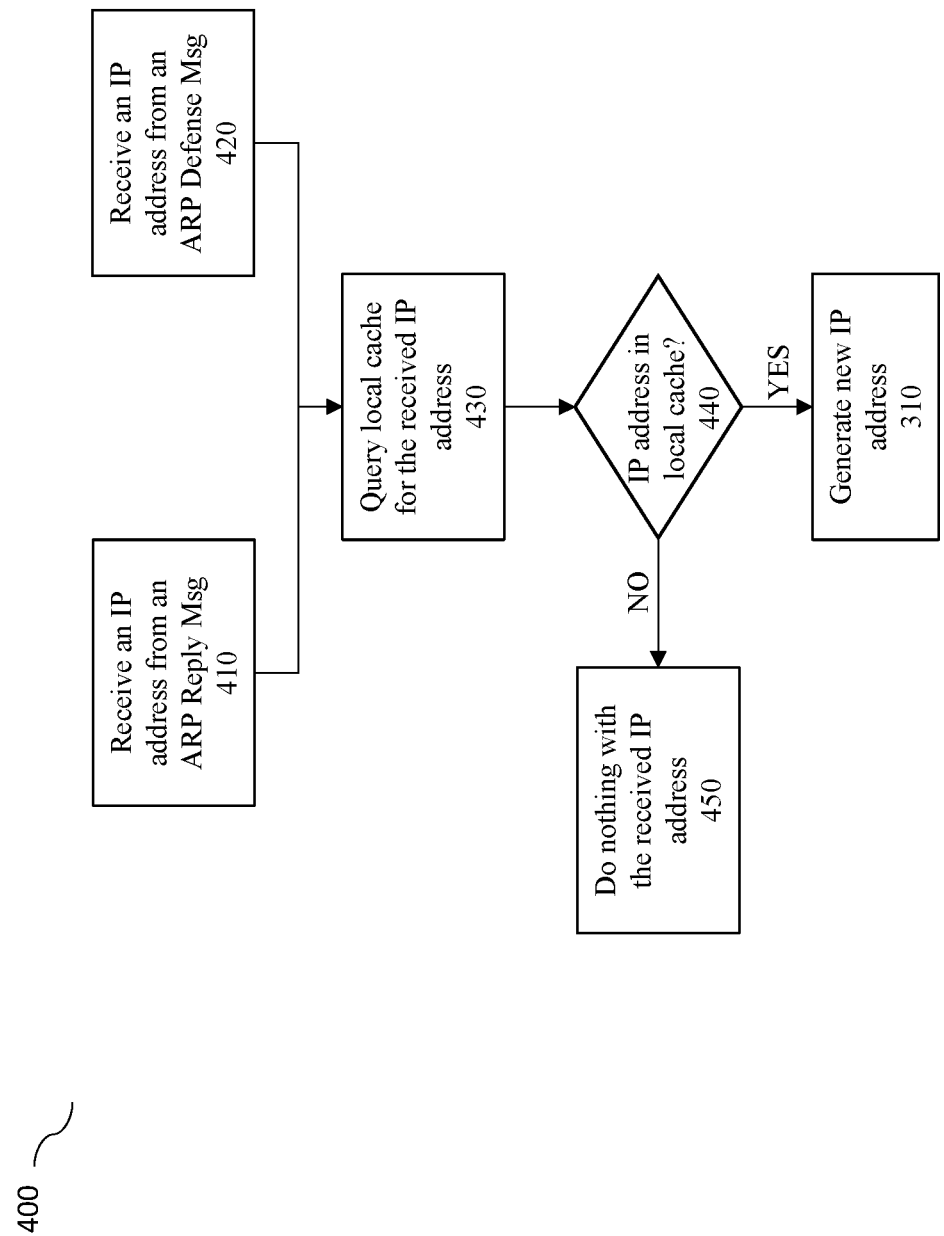

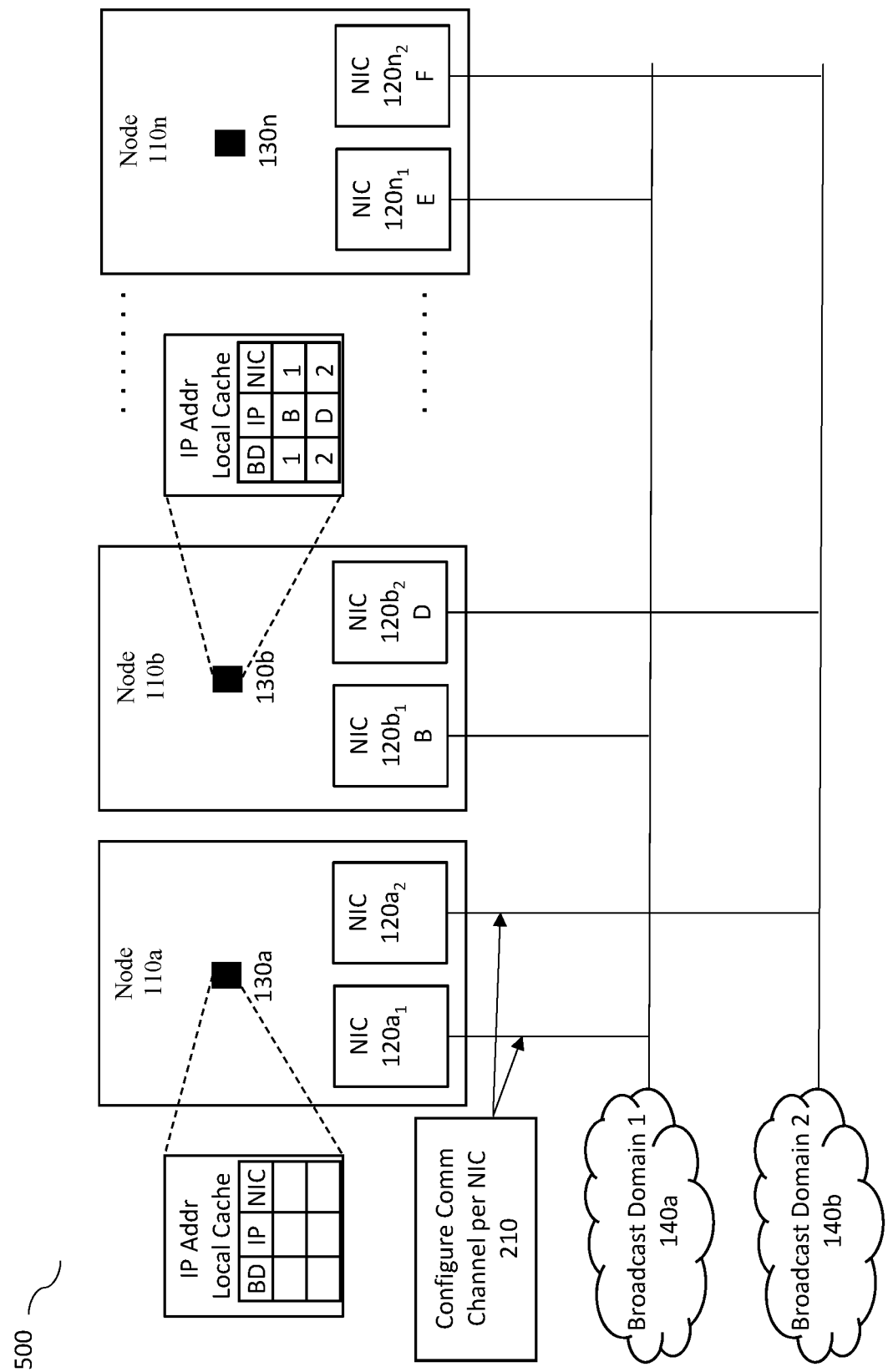

RAPID DUPLICATE IP ADDRESS DETECTION FOR FLOATING IP ADDRESS CROSSING MULTIPLE CLUSTER BROADCAST DOMAINS

FIELD

This disclosure concerns a method, a computer program product, and a computer system for managing assignable IP addresses to devices in computer and/or data communication networks, and in particular, for detecting duplicate IP addresses.

BACKGROUND

In a computer and/or data communication network, each device connected to the network (e.g. via a "network adapter") typically has its own, unique low level address, such as a manufacturer assigned Media Access Control Address ("MAC") in the case of an Ethernet network. A network adapter's address is used to uniquely identify the network adapter in the network when sending data to the network adapter, or when receiving data from the network adapter. In a healthy network, no two network adapters have the same address. Data is typically transmitted in such networks in small bursts, often referred to as packets, frames, or cells, depending on the network origins and terminology.

However, most network adapters also provide a software-definable address which is on top of the manufacturer-supplied address. These "soft" addresses are often used by systems to reorganize or optimize the addressing scheme within a local area network ("LAN"), or within a wide area network ("WAN"). Such software defined addresses are referred to as Locally Administered Addresses ("LAA") in the Ethernet paradigm.

Care must be taken when assigning soft addresses to avoid assigning a soft address that is the same as a soft address of another network adapter on the same network. An invalid address will cause networking problems, especially in the case when the invalid address is a duplicate of another address on the same network (e.g., subnet).

Most data network protocols, such as Ethernet, provide some sort of fundamental process or mechanism to detect duplicate addresses, and in some cases, reassign a duplicate address a new and unique address within the network. Ethernet's Gratuitous Address Resolution Protocol ("ARP"), and Internet Protocol ("IP") Address Conflict Detection ("ACD") processes are two such mechanisms. These existing protocols provide detection of duplicate IP addresses within a particular network such as a broadcast domain.

A broadcast domain is a logical division of a computer network in which all nodes (e.g., physical servers, computing devices, etc.) within a broadcast domain can reach each other by broadcast communication messages sent at a data link layer. A broadcast domain can be within a same local area network ("LAN") segment or a broadcast domain can be bridged to other LAN segments. Any computer connected to a same Ethernet repeater or switch is a member of the same broadcast domain. Further, any computer connected to the same set of inter-connected switches/repeaters is a member of the same broadcast domain. Routers and other higher-layer devices form boundaries between broadcast domains.

Unfortunately, in a computer communication network that has multiple broadcast domains, the existing protocols of ARP and/or ACD do not provide adequate detection of duplicate IP addresses for computing devices that can be connected across the multiple broadcast domains. For example, a high availability computing environment may include a first cluster of active servers configured within a first broadcast domain and a second cluster configured within a second broadcast domain such that if the first cluster fails, the second cluster may take over processing for the failed first cluster. Failover may be achieved by simply floating an IP address for a server from within the first cluster to a server within the second cluster so that communications with the first cluster are effectively transferred to the second cluster. In order to implement the floating IP address to the second cluster on the second broadcast domain, the IP address from the first broadcast domain must also be unique within the second broadcast domain. However, current approaches to detecting duplicate IP addresses are limited to only detect duplicate IP addresses within a particular broadcast domain, not across multiple broadcast domains within a computing network system.

Therefore, there is a need for a method and/or system for detecting duplicate IP addresses across multiple broadcast domains within a computing network system.

SUMMARY

According to some embodiments, described are improved systems, computer program products, and methods detecting conflicting addresses across multiple broadcast domains.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope.

The drawings use like reference numerals to identify like elements. A letter after a reference numeral, such as "120a," indicates that the text refers specifically to the element having that particular reference numeral. A reference numeral in the text without a following letter, such as "120," refers to any or all of the elements in the drawings bearing that reference numeral (e.g. "120" in the text refers to reference numerals "120a" and/or "120b" in the drawings). The disclosure will be described and explained with additional specificity and detail through the use of the accompanying drawings in which:

FIG. 4A illustrates a flowchart of an approach to determine whether there is a conflict with an IP address of a NIC across multiple broadcast domains, according to some embodiments of the present disclosure.

FIGS. 5A-5K provides an illustrative example, according to some embodiments of the present disclosure.

DETAILED DESCRIPTION

Figure 1A:
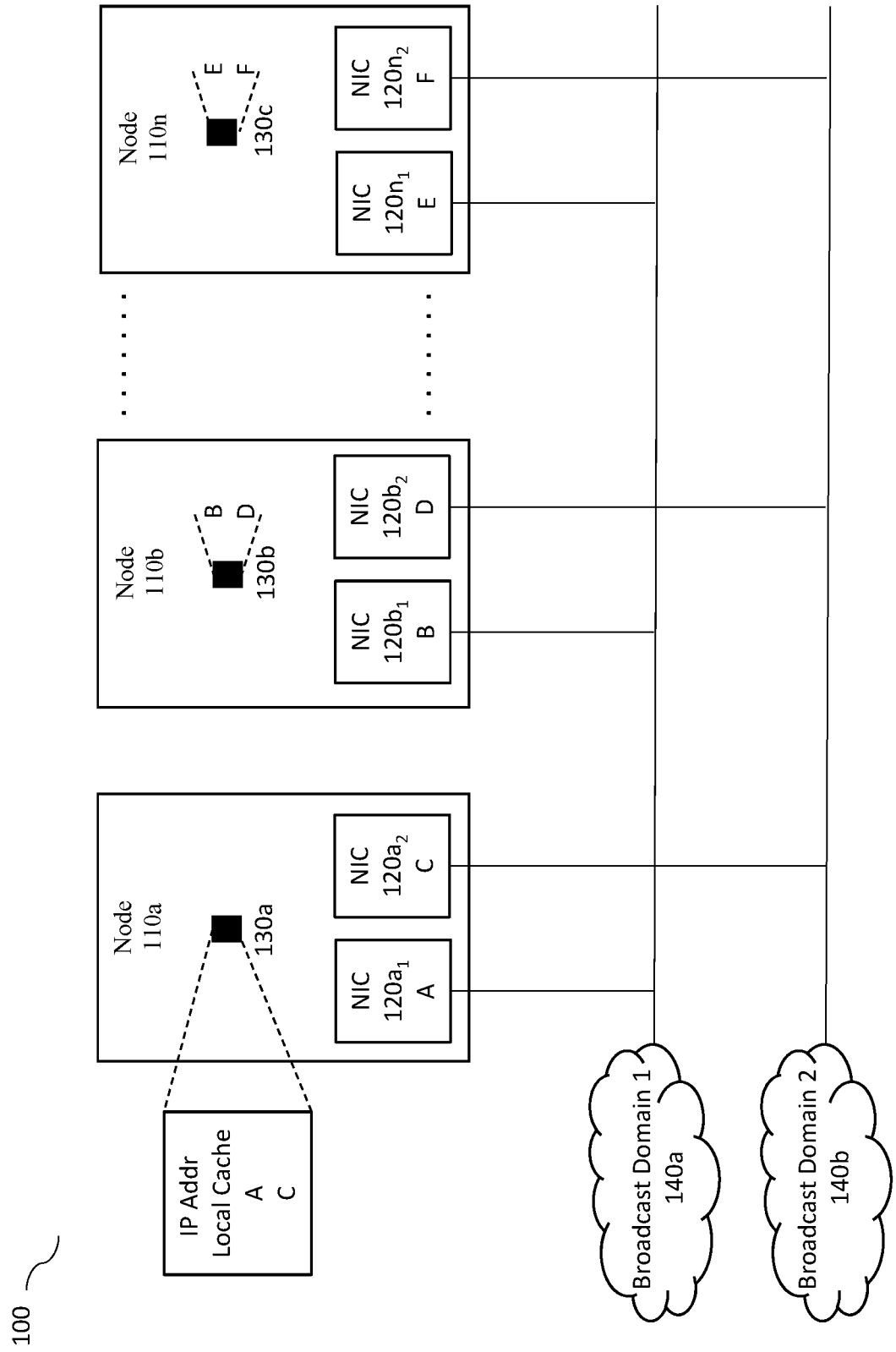
FIG. 1A illustrates a computing network system having multiple computing devices, for implementing some embodiments of the present disclosure.

Various embodiments will now be described in detail, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Overview

The present disclosure provides an improved approach to ensure newly generated IP addresses are unique across multiple broadcast domains such that if an IP address assigned to a particular node/computing device is floated over to another node/computing device on a different broadcast domain (e.g., in the case of a failover scenario) the IP address is still unique even within the other broadcast domain because when the IP address was generated for the particular node/computing device, the IP address was also determined to be unique on the other broadcast domain(s) using the presently disclosed approach(es). As discussed previously, legacy approaches to ensure IP address uniqueness are available only for a particular broadcast domain. For example, Ethernet's Gratuitous Address Resolution Protocol ("ARP"), and IP Address Conflict Detection ("ACD") processes are two such mechanisms. However, there are no current solutions for ensuring IP address uniqueness across multiple broadcast domains.

In contrast, the use of the ARP and ACD processes for a single broadcast domain may be summarized as follows. When a new IP address is configured for a computing device in a broadcast domain, an ARP request, probe, and/or announcement message may be constructed and broadcasted to all computing devices configured to communicate of a particular broadcast domain to announce an intention of using the new IP address for a computing device on the particular broadcast domain. Other computing devices listening to messages received from the particular broadcast domain may determine whether the new IP address conflicts with an IP address used by its own computing device by checking its own list of IP addresses used on the same interface/NIC/broadcast domain.

If a conflict occurs, the respective computing device may respond to the ARP request, probe, and/or announcement message with an ARP response message (e.g., sending an ARP Reply via unicast to just the computing device that sent the ARP request, probe, and/or announcement) to indicate that the new IP address is already being used such that the new IP address is a duplicate. However, if no computing device is already using the new IP address, no ARP response message may be received. This is because an ARP response message may only be sent in response to a conflict in the IP addresses. Non-conflicting IP addresses in an ARP message may be discarded by the receiving computing device since no action is required when there are no IP address conflicts.

ACD is not limited to only the time of initial interface configuration (e.g., when a computing device is sending ARP Probes/ARP Announcements). ACD is an ongoing process that is in effect for as long as a computing device is using an address. At any time, if a computing device receives an ARP message (e.g., Request *or* Reply) where the 'sender IP address' is (one of) the computing device's own IP address(es) configured on that interface/NIC, but the 'sender hardware address' does not match any of the computing device's own interface addresses, then this is a conflicting ARP packet, indicating some other computing device also thinks it is validly using this IP address.

In some embodiments, a networking system may require quick conflict detection so that any possible IP address conflict between computing devices within the same broadcast domain may be detected earlier rather than later. In these embodiments, each computing device may periodically send ARP Replies using link-level broadcast, hereinafter referred to as "ARP Defense messages," instead of sending only ARP Requests via broadcast, and ARP Replies via unicast to a particular computing device. ARP Defense messages are generally used when the benefit of faster conflict detection outweighs the cost of increased broadcast traffic and increased packet processing load on the participant network computing devices.

The present approach implements a solution for ensuring IP address uniqueness for a particular broadcast domain (e.g., ARP and/or ACD) in combination with additional processing and a particular data structure to ensure that an IP address associated to a computing device is unique not only for a particular broadcast domain, but for other broadcast domain(s) within a computing network system as well. In some embodiments, a node/computing device within the computing network system may be configured with one or more monitored network interfaces to communicate with other nodes/computing devices within the computing network system. A monitored network interface may be, as an example, a network interface card ("NIC") that may be configured to provide communication with other node(s) communicatively coupled to a particular broadcast domain.

When a new node is added to an existing computing network system, the new node may be configured to communicate with more than one broadcast domain. One or more NICs may be configured within the node to communicate with other computing devices on respective broadcast domains. An IP address may be generated for each NIC configured within the new node. Each NIC may be associated to a separate broadcast domain so that the new node may communicate with other nodes on different broadcast domains. In some embodiments, more than one NIC may be configured to communicate within the same broadcast domain as long as each NIC is assigned a unique IP address for the same broadcast domain and the multiple broadcast domains within the computing network system.

As new IP addresses are generated and assigned to respective NICs on the new node, the new IP addresses are added to a data structure. The data structure stores the IP addresses associated to the different NICs configured on the new node, along with the broadcast domain that the NIC is configured to communicate within, so that each NIC may query the data structure to determine if any other NICs associated to other nodes within the plurality of broadcast domains are currently using or attempting to use an IP address that is currently assigned to a NIC on the new node. By having the data structure storing IP addresses assigned to NICs configured on the node, processes for detecting duplicate IP addresses within a particular broadcast domain (e.g., ARP and/or ACD) may be extended to further cross reference the data structure to detect duplicate IP addresses across multiple broadcast domains.

In some embodiments, querying the data structure may be used for defending an IP address that is already established by the new node. In other embodiments, querying the data structure may be used for determining whether a newly generated and assigned IP address is already being used by another node within either the same broadcast domain or at a different broadcast domain.

Definitions

Some of the terms used in this description are defined below for easy reference. The presented terms and their respective definitions are not rigidly restricted to these definitions-a term may be further defined by the term's use within this disclosure. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A illustrates a computing network system 100 having multiple computing devices (e.g., nodes 110a, 110b, . . . 110n). The multiple computing devices may be a computer, a workstation, a server, a networking computer, or any computing equipment that communicates with another computing device over a network. Each of the computing devices may be configured with network adapters (e.g., NICs 120) to communicate with one another.

A network adapter is a component of a computer's hardware that is used for communicating over a network with another computer. A computer may connect with another computer, server or any networking device over a LAN and/or WAN connection using a network adapter. One type of network adapter is a network interface card (NIC). A NIC provides a computer with a dedicated, full-time connection to a network by implementing the physical layer circuitry necessary for communicating with a data link layer standard, such as Ethernet or Wi-Fi.

Each card represents a device and can prepare, transmit and control the flow of data on the network. The NIC uses the Open Systems Interconnection (OSI) model to send signals at the physical layer, transmit data packets at the network layer and operate as an interface at the TCP/IP layer. The term network interface card may be used interchangeably with the terms network interface controller, network adapter and LAN adapter in the present disclosure. A network adapter can be used over a wired or wireless network.

One common type of network for communicatively coupling computing devices to one another is the Ethernet network. In an Ethernet based network, each NIC is assigned a unique IP address within the network so that messages sent from one computer to another computer may be directed to the appropriate destination computer and vice versa. As shown in FIG. 1A, each NIC in the computing network system 100 is assigned to a unique IP address. For example, node 110a is a computing device that has two NICs configured such that IP address "A" is assigned to NIC $120a_1$ and IP address "C" is assigned to NIC $120a_2$. Node 110b is another computing device that has two NICs configured such that IP address "B" is assigned to NIC $120b_1$ and IP address "D" is assigned to NIC $120b_2$. Node 110n also has two NICs configured such that IP address "E" is assigned to NIC 120n1 and IP address "F" is assigned to NIC 120n2.

One of ordinary skill in the art may appreciate that although three nodes are depicted in FIG. 1A for illustrative purposes, the present disclosure may be implemented with a two-node system or a multi-node system that may include more than three nodes such that each NIC configured in each node of the computing network system 100 is assigned an IP address that is unique within at least the computing network system 100.

Each node within the computing network system 100 may also include a shareable data structure 130 for storing IP addresses assigned to respective NICs within the local node. The shareable data structure 130 is shared between the NICs configured within the local node. For example, data structure 130a has IP addresses "A" and "C" which associate to the IP addresses assigned to NIC $120a_1$ and NIC $120a_2$, respectively. Data structure 130b has IP address "B" and "D" which associate to the IP addresses assigned to NIC $120b_1$ and NIC $120b_2$, respectively. As discussed previously, each data structure 130 of each node may be accessed by NICs locally configured on respective nodes so that the different NICs on each node may be able to query their respective data structure 130 to determine whether IP addresses received from ARP messages sent from other nodes within the different broadcast domains may already be assigned to NICs residing on the respective nodes.

The nodes of the computing network system 100 may be communicatively coupled to different broadcast domains 140. A broadcast domain, as discussed earlier, is a logical division of a computer network in which all nodes (e.g., physical servers, computing devices, etc.) within a broadcast domain can reach each other by broadcast communication messages sent at a data link layer. A broadcast domain can be within a same local area network ("LAN") segment or a broadcast domain can be bridged to other LAN segments. Any computer connected to a same Ethernet repeater or switch is a member of the same broadcast domain. Further, any computer connected to the same set of inter-connected switches/repeaters is a member of the same broadcast domain. Routers and other higher-layer devices form boundaries between broadcast domains.

As shown in FIG. 1A, computing network system 100 has two different broadcast domains, broadcast domain 1 (e.g., broadcast domain 140a) and broadcast domain 2 (e.g., broadcast domain 140b). Node 110a is communicatively coupled with broadcast domain 1 via NIC $120a_1$. Node 110b is communicatively coupled with broadcast domain 1 via NIC $120b_1$. Node 110n is communicatively coupled with broadcast domain 1 via NIC $120n_1$. Likewise, nodes 110a, 110b, and 110n are communicatively coupled with broadcast domain 2 via NIC $120a_2$, NIC $120b_2$, and NIC $120n_2$, respectively.

One of ordinary skill in the art may appreciate that computing network system 100 may also be implemented with more than two broadcast domain, such that as additional broadcast domains are implemented, additional NICs may be configured within respective nodes to communicatively couple respective nodes to the additional broadcast domains. Additionally, although each node depicted within FIG. 1A is connected to both broadcast domains 1 and 2, one of ordinary skill in the art may also appreciate that each node may not be configured to both or all of the broadcast domains available in a computing network system 100.

In some embodiments, each NIC 120 may be configured with a communication channel with respective broadcast domains 140 such that the communication channel may include both a sending socket and a receiving socket to send and receive messages between a NIC 120 and a respective broadcast domain. In certain embodiments, multiple listeners are implemented such that a given node may use an appropriate socket to listen on broadcast domain 1 with a first listener and to listen on broadcast domain 2 with a second listener. In this way, the multiple listeners permit the node to identify whether a desired address is already held by another node, even when the address already exists in a second broadcast domain that is different from a first broadcast domain for which the address is being sought.

When a new node is added to the computing network system 100 or when a new NIC is being configured on an existing node to connect the existing node to a broadcast domain, a new IP address may be generated. The new IP address may be added to the data structure 130 (e.g., local cache) so that the different NICs within the new/existing node may access the data structure 130 to determine whether the new IP address is unique in the computing network system 100.

Consider the situation where node 110a seeks to assign address A to NIC $120_{a1}$ that is associated with broadcast domain 1 (140a). In this situation, conventional approaches would not be able to determine whether a conflict exist between this assignment of address A to NIC $120_{a1}$ in broadcast domain 1 and any conflicting address that already exists in broadcast domain 2 (140b). However, with the present embodiment, the procedure to seek the address A for NIC $120_{a1}$ would cause an entry for A to be placed into local cache 130a on node 110a. Respective listeners would be implemented for both broadcast domain 1 and broadcast domain 2 to listen for any messages (e.g., based upon regular ARP broadcasts and/or based upon a defense from another node when an ARP request is made for address A) indicating the existing usage of an address A (as recorded in the local cache) on any of the broadcast domains.

During the probe/announce/defense processing stages, processing threads for each broadcast domain (or any other processing entity as appropriate such as a process or task) may be operating and checking for ARP replies and/or other relevant messages. If any given thread detects a conflict for a requested address, an alert is provided to the requester to give up the address, and to select another address. Since the monitoring is occurring for the multiple broadcast domains, this means that a conflict can be detected even if the requested address is on a first broadcast domain but the conflict exists on a second broadcast domain.

Figure 1B:
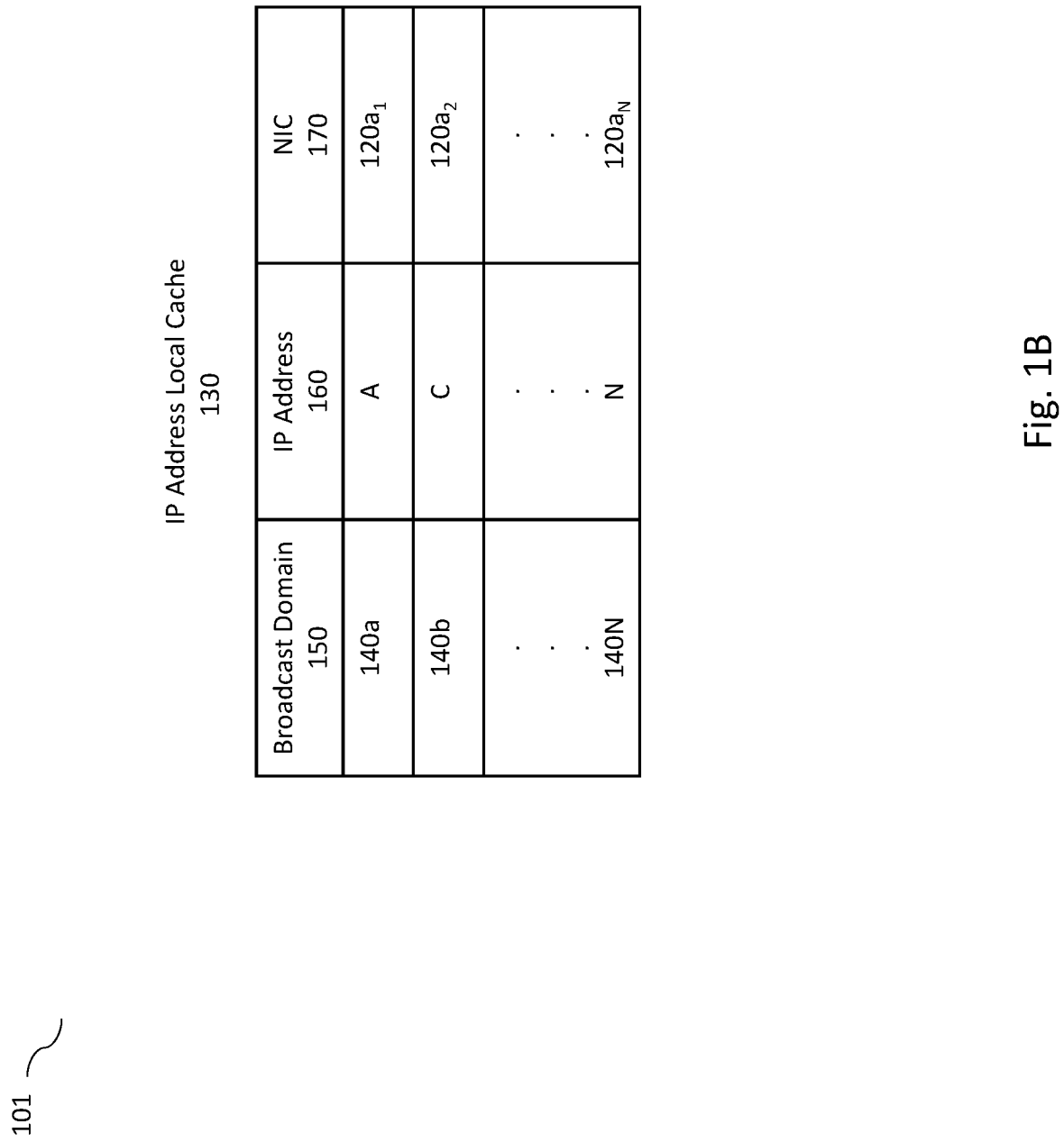
FIG. 1B illustrates a data structure for storing IP addresses associated to different NICs, according to some embodiments of the present disclosure.

FIG. 1B illustrates a data structure 105 for storing IP addresses associated to different NICs of a particular node, according to some embodiments of the present disclosure. The data structure 130 may include columns for storing a relationship between a NIC (e.g., NIC 170), an IP address (e.g., IP Address 160) associated to the NIC and a broadcast domain (e.g., Broadcast Domain 150) that the NIC is configured to communicate within a broadcast domain for a particular node. Each row of the data structure may be associated to a particular NIC configured within the particular node. Data structure 130 may be used to store the IP addresses of the NICs configured locally within the node that will be used to determine whether an IP address of a particular NIC in the computing network system 100 is unique across different broadcast domains, as discussed further below.

For example, when a new NIC is added to the node, a new row may be created within the data structure 130 for storing the association between the new NIC, an IP address assigned to the NIC, and a broadcast domain for the new NIC to communicate within. The data structure 130 may be shared between the multiple NICs that are configured on the local node so that as each NIC is implementing the standard duplicate IP address detection process (e.g., ARP and/or ACD), the NICs may also reference the data structure to determine whether an IP address received in an ARP Probe, ARP Announce, or ARP Defense message is a duplicate IP address that may reside on either the same broadcast domain or a different broadcast domain by simply querying the data structure to determine if the received IP address is found that is associated to an IP address of a NIC residing on the local node. In some embodiments, the data structure 130 may be implemented in a local cache memory of the node. In other embodiments, data structure 130 may be implemented in a persistent storage medium.

Figure 2:
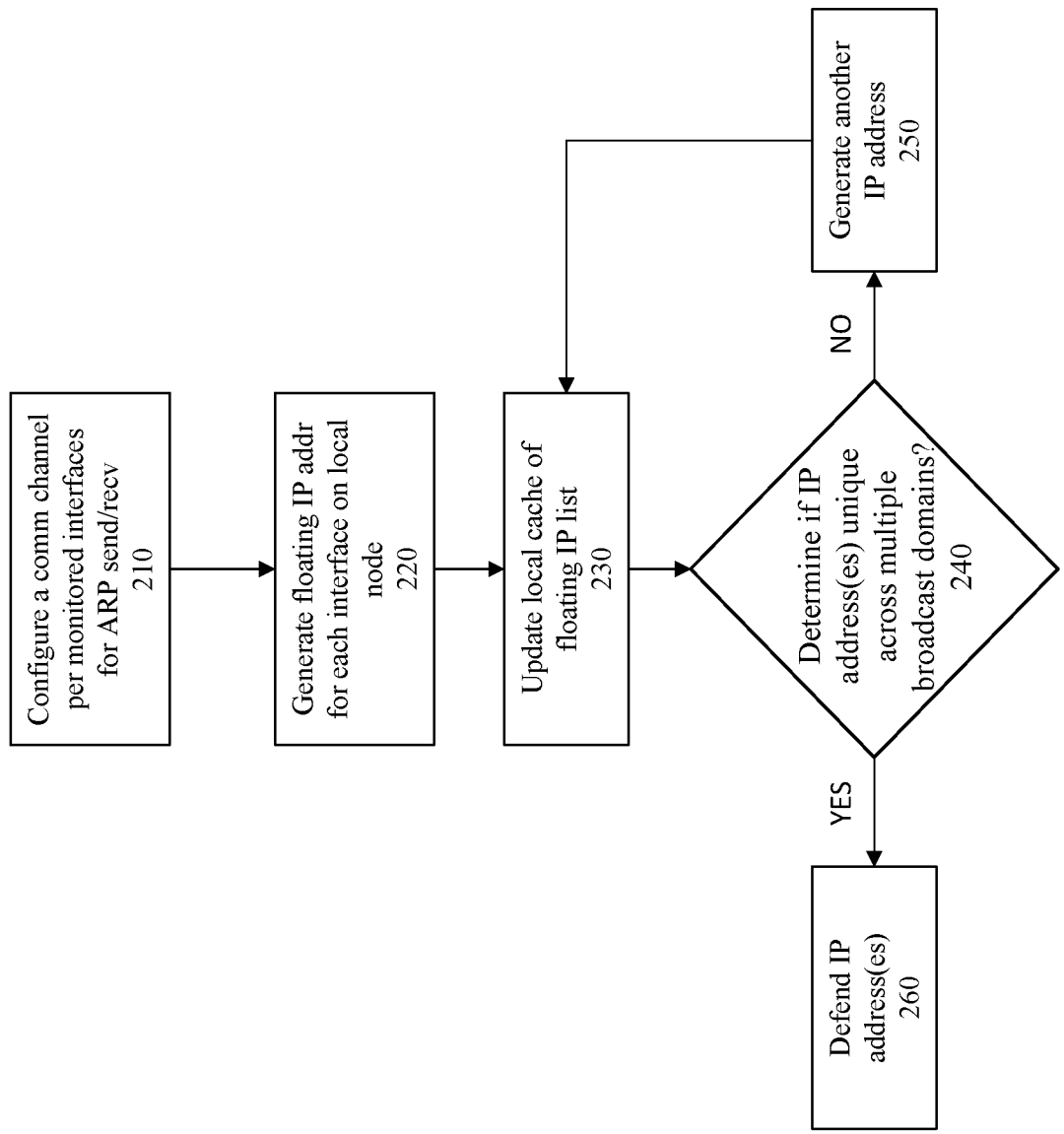
FIG. 2 illustrates a high-level flowchart of an approach to implement some embodiments of the present disclosure.

FIG. 2 illustrates a high-level flowchart 200 of an approach to implement some embodiments of the present disclosure. When a NIC is being configured on a node to communicate within a particular broadcast domain, a communication channel may be configured (e.g., at step 210) for the NIC to communicate with other computing devices on the particular broadcast domain. In some embodiments, communication from the NIC may include (1) sending/broadcasting ARP Probe, ARP Announcement and/or ARP Defense messages to other computing devices within the particular broadcast domain, and (2) receiving APR reply/response messages or ARP Defense messages from other computing devices within the particular broadcast domain for establishing the NIC on the particular broadcast domain.

At step 220, an IP address may be generated for the NIC so that the NIC may be uniquely identifiable within the particular broadcast domain associated to the NIC. In some embodiments, the IP address may be a floating IP address such that if, for any reasons, communications via the particular broadcast domain is no longer available or viable over the particular broadcast domain, the IP address assigned to the NIC (e.g., a first NIC) may be floated over to another NIC (e.g., a second NIC) configured within the node so that communications sent and received via the IP address may be processed at the other/second NIC. In some embodiments, the other/second NIC may be configured to communicate on a different broadcast domain. This type of floating IP address may be useful, for example, in failover scenarios where a failure condition has occurred such that continued operation of the system requires the existing processing to be taken over by another entity. In this failover situation, a first entity/mechanism may need to failover to a second entity/mechanism to retain operational capacity of the system. Therefore, the floating IP address may need to "float" to the failover entity/mechanism which may reside into a different broadcast domain. Thus, it is important that the IP address that is being floated over from the first NIC from the first/particular broadcast domain is also a unique IP address in the second/different broadcast domain.

At step 230, the IP address generated for the NIC may be updated in a data structure (e.g., data structure 130) that is local to the node. The IP address generated may be associated to the both the NIC and the particular broadcast domain that the NIC is configured to communicate within. As discussed above, the data structure may be a shareable data structure such that NICs configured within the node may access the shared data structure.

At step 240, information stored in the data structure may be accessed to determine whether the IP address generated for the NIC is unique across multiple broadcast domains. The determination may be based at least in part on ARP and/or ACD messages received from other computing devices (e.g., ARP reply/response messages to the ARP Probe/ARP Announcement messages sent/broadcasted to other computing devices or ARP Defense messages received from other computing devices) within the computing network system. More details regarding the determining step 240 are disclosed with respect to FIG. 3 below.

At step 250, if it is determined that the IP address generated for the node is already being used by another computing device within the computing network system, a second IP address may be generated for the NIC so that the NIC may have an IP address that is unique not only in the particular broadcast domain associated to the NIC, but across the multiple broadcast domains that are configured within the computing network system. As the second IP address is generated and associated to the NIC, the second IP address generated for the NIC may be updated in the data structure (e.g., at step 230) so that the second IP address is being associated to the NIC instead of the first IP address generated that was determined to be a duplicate IP address across the multiple broadcast domains of the computing network system. For example, the IP address 160 column associated to the row of the NIC and the particular broadcast domain is updated with the second IP address to keep track of the IP address being assigned to the NICs of the node. Step 240 may be repeated again for the second IP address to determine whether the second IP address is unique across the multiple broadcast domain. Steps 230, 240 and 250 may be repeated until a unique IP address may be determined across the multiple broadcast domain.

At step 270, if it is determined that the IP address generated for the NIC is unique across multiple broadcast domain (e.g., from step 240), then the IP address that was generated for the NIC will be defended using the ARP/ACD process to send/broadcast ARP Defense messages to notify other computing devices within a broadcast domain that a particular IP address is already being used by a particular computing device.

Figure 3:
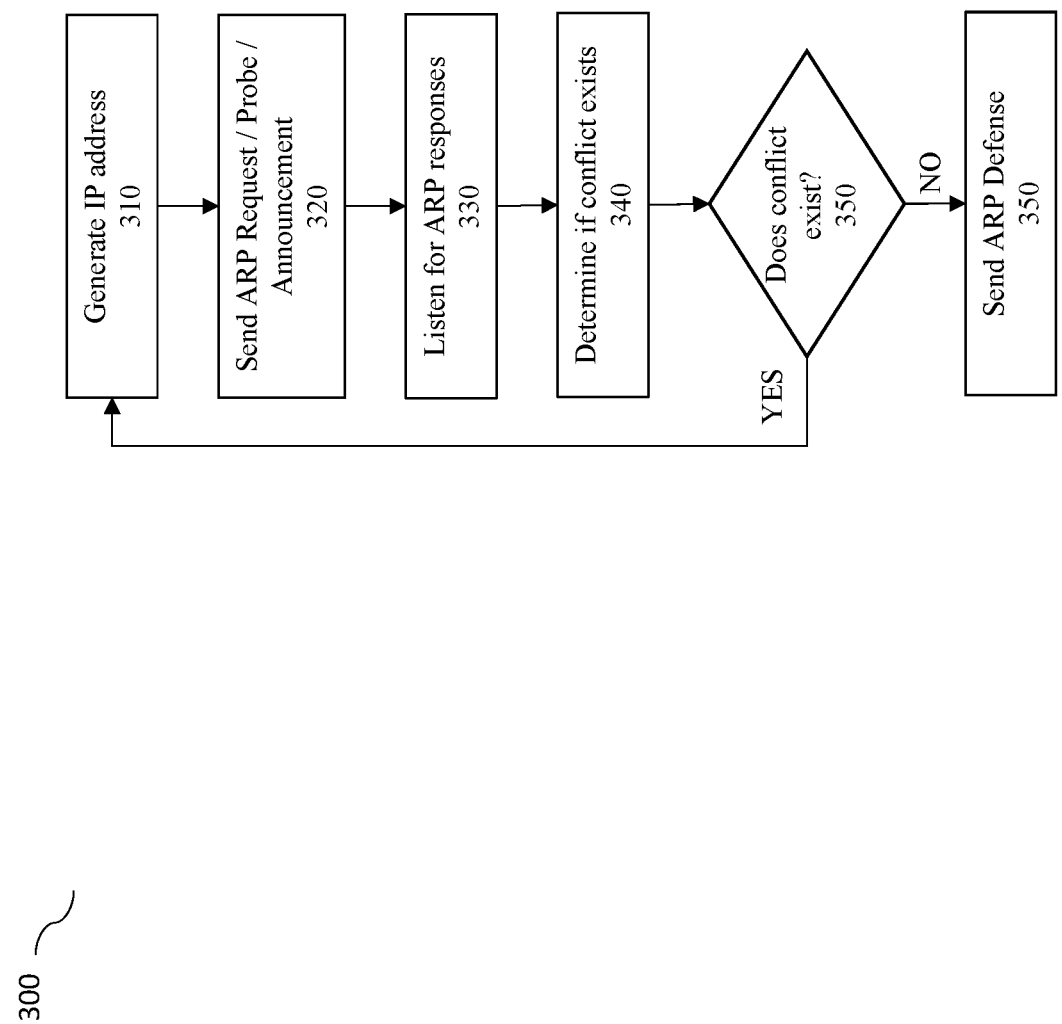
FIG. 3 illustrates a flowchart of an approach to determine whether an IP address is unique across multiple broadcast domains, according to some embodiments of the present disclosure.

FIG. 3 illustrates a flowchart 300 of an approach to determine whether an IP address is unique across multiple broadcast domains, according to some embodiments of the present disclosure. At step 310, an IP address may be generated for one or more computing devices (e.g., a NIC) within a node of a computing network system, similar to step 220 from FIG. 2. The IP address of the NIC may be updated in a data structure (e.g., data structure 130 in a shared cache) for the node. As discussed above, other NIC(s) within the node having IP addresses assigned to respective NIC(s) for the node may be also be stored within the data structure. The other NICs may be associated to either the same broadcast domain, different broadcast domains, or a combination thereof within the computing network system. It is noted that a new node having multiple NICs may result in multiple new addresses being requested for the NICs, where a first address for the first NIC is requested concurrently with a second address for a second NIC. In an alternate embodiment, the multiple addresses may be requested on a sequential basis.

At step 320, an ARP request, probe, and/or announcement message associated with the generated IP address may be sent via a broadcast to other computing devices communicatively coupled to the broadcast domain that is associated to the NIC that was assigned the generated IP address. As discussed above, the ARP request, probe, and/or announcement message is broadcast to other computing devices to announce to other computing devices on the broadcast domain that there is an intention to use the generated IP address with the NIC on the broadcast domain, unless another computing device is already is using the generated IP address, for which an ARP response message (e.g., an ARP Reply) may be received from another computing device already using the generated IP address on the broadcast domain.

At step 330, the NIC listens and/or monitors for ARP responses received from the broadcast domain. ARP responses received from the broadcast domain may include ARP Reply messages sent from another computing device on the broadcast domain that may already be using the IP address that was generated for the NIC. The ARP Reply message is a message sent in response to the ARP request, probe, and/or announcement that was broadcast to the other computing devices on the broadcast domain from step 320.

As previously noted, certain embodiments may employ multiple listeners to listen on multiple broadcast domains. The multiple listeners permit the node to identify whether a desired address is already held by another node, even when the address already exists in a second broadcast domain that is different from a first broadcast domain for which the address is being sought. Therefore, a first listener is configured to listen for messages on a first broadcast domain and a second listener is configured to listen for messages on a second broadcast domain.

One of the additional processing steps of the present disclosure that extends the functionalities of the conventional ARP/ACD process to identify duplicate IP address across different/multiple broadcast domains is step 340. At step 340, a determination is made on whether an IP address conflict exists across multiple broadcast domains. The determination may be implemented using a few different methods disclosed in more details below with references made to FIG. 4A and FIG. 4B. For example, FIG. 4A discloses the current/newly configured node is listening for ARP Defense messages received from other nodes/NICs and querying the local data structure 130 to determine if an IP address from the ARP Defense message exists in the local data structure 130. However, FIG. 4B discloses that the determination step 340 may be implemented by the other nodes of computing network system listening for ARP request/probe/announcement/defense messages to defend the IP addresses that are in the respective local data storage of the other node(s). More details regarding the two different methods are further disclosed below in conjunction with FIGS. 4A-4B.

At step 350, if it is determined that any IP address conflict is detected between the newly generated IP address(es) and any other computing device within the computing network system, processing may begin again at step 310 to generate a new IP address for the NIC with the conflicting IP address to be further analyzed for uniqueness across not only the broadcast domain of the NIC, but across the plurality of broadcast domains of the computing network system.

However, in some embodiments, after a configured threshold has been elapsed (e.g., a configurable number of ARP Probes/Announcements have been sent without an ARP response/reply of conflict, or after a configurable amount of time have elapsed), the IP address may be deemed to be unique across the plurality of broadcast domains. Once it is determined that the generated IP address is unique across the plurality of broadcast domains, ARP Defense messages (e.g., at step 350) may be sent via broadcast to the other nodes of the computing network system to defend the newly generated/confirmed IP address.

FIG. 4A illustrates a flowchart 400 of an approach to determine whether there is a conflict with an IP address of a NIC across multiple broadcast domains, according to some embodiments of the present disclosure. At 410, a NIC on the local node that has just sent out the ARP request/probe/announcement message may receive an IP address from an ARP Reply message sent from another node within the same broadcast domain. If the NIC that has just set out the ARP request/probe/announcement message receives a subsequent ARP Reply message that has the same IP address as the newly generated IP address, then a duplicate IP address is detected from within the same broadcast domain.

However, to determine whether the IP address is unique across multiple domains, the processing of the ARP/ACD protocol may include at least steps 420 and 430. At step 420, any NIC on the local node that just sent out the ARP request/probe/announcement message may receive an IP address from an ARP Defense message from the plurality of broadcast domains. As discussed above, ARP Defense messages may be periodically broadcasted from different computing devices across the plurality of broadcast domain to notify at least IP addresses currently in used by computing devices within the computing network system.

At step 430, the shared data structure 130 for the node may be queried to determine if the received IP address from the ARP Defense message is stored in the shared data structure 130. This process is different than the conventional approach of the ARP/ACD protocol as discussed above where each NIC, in the conventional approach, queries a cached list of IP addresses used by respective NICs—not a shared list of IP addresses used by the multiple NICs of the local node. By providing the shared data structure 130, having the list of IP addresses assigned to NICs on the local node, to be accessible to all NICs of the node, each NIC within the node may be able to determine whether an IP address received within an ARP Defense message received from the plurality of broadcast domain is a duplicate with an IP address(es) being generated for a particular NIC on the local node, even if the particular NIC is configured to communicate on a different broadcast domain. In one embodiment, the aspect of the shared data structure being "shared" corresponds to the implementation of a shared memory and/or cache region having the data structure that is accessible by multiple threads of execution in a multi-threaded system, where different threads correspond to the different LANs/broadcast domains.

If there are no matches detected between the received IP address from the ARP Defense message and an IP address stored within the data structure 130, which indicates no conflicting/duplicate IP address, then at 450, no action needs to be taken on the received ARP Defense message. However, if a match is detected between the received IP address from the ARP Defense message and an IP address within the shared data structure 130 (e.g., which indicates that there is a conflict between the newly generated IP address and an IP address that may already be in used by another computing device within the computing network system), then a new IP address may be generated at step 310 to assign to the new NIC, at which point, the process to determine whether the newly generated IP address is unique starts again until it is confirmed that the newly generated IP address is unique across the plurality of broadcast domain.

Figure 4B:
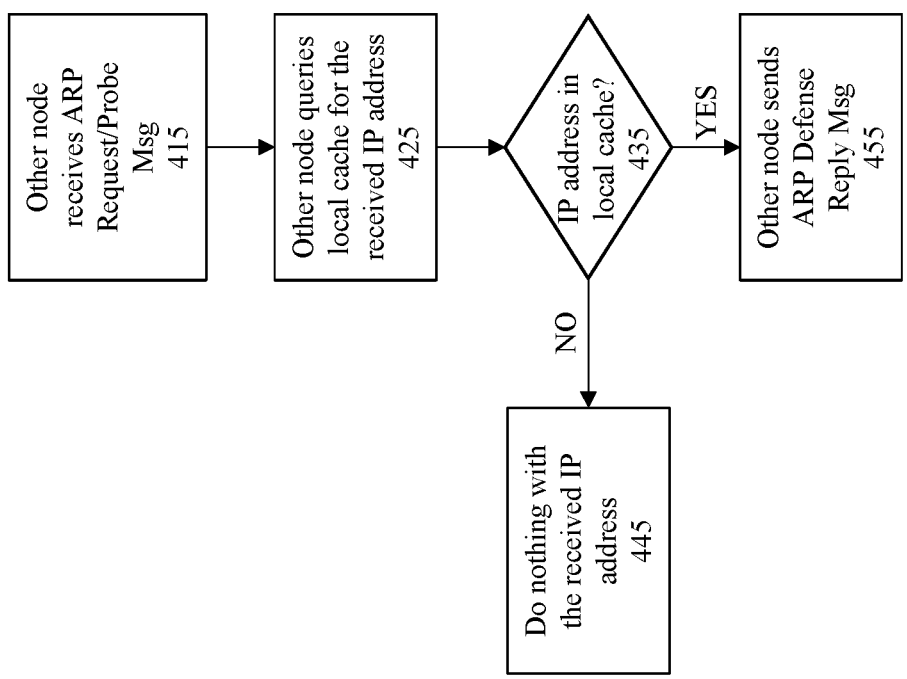
FIG. 4B illustrates an alternate flowchart of an approach to determine whether there is a conflict with an IP address of a NIC across multiple broadcast domains, according to some embodiments of the present disclosure.

FIG. 4B illustrates an alternate flowchart 405 of an approach to determine whether there is a conflict with an IP address of a NIC across multiple broadcast domains, according to some embodiments of the present disclosure. The process of FIG. 4B is directed to other nodes listening/receiving ARP request/probe/announcement messages so that the other nodes may defend IP address that each respective other nodes are defending, so that new nodes generating new IP addresses do not generate a new IP address that conflicts or are duplicates with an IP address that is already being used by a computing device in the computing network system.

At 415, other node(s) within a particular broadcast domain may receive the ARP request/probe/announcement message that was sent via broadcast to the nodes that are coupled to the particular broadcast domain of the NIC having the newly generated IP address. Since the other nodes have access to their own local shared data structure 130, the other node(s) may query their respective local shared data structure 130 to determine whether the newly generated IP address received from the ARP request/probe/announcement message exists in their respective shared data structure 130. If it is determined, at step 435, that there are no matches between the newly generated IP address received from the ARP message with any IP addresses in the respective local shared data structure 130, then per step 445, no action needs to be taken.

However, if it is determined that there is a match, then at 455, the other node(s) may send an ARP Defense Reply message back to the node that sent the ARP request/probe/announcement message to notify the node that the IP address that the node is trying to establish is already being used by another computing device on a different broadcast domain. This approach may be implemented where the node checks its shared data structure for existing IP addresses across multiple/all broadcast domains, even where the request is received for a given broadcast domain. This way, in this approach, since each node is constantly cross referencing their respective locally shared data structure 130 whenever they receive an ARP request/probe/announcement, the detection of a potential duplicate IP address may be determined quickly upon receiving the ARP request/probe/announcement message.

Figure 5A:
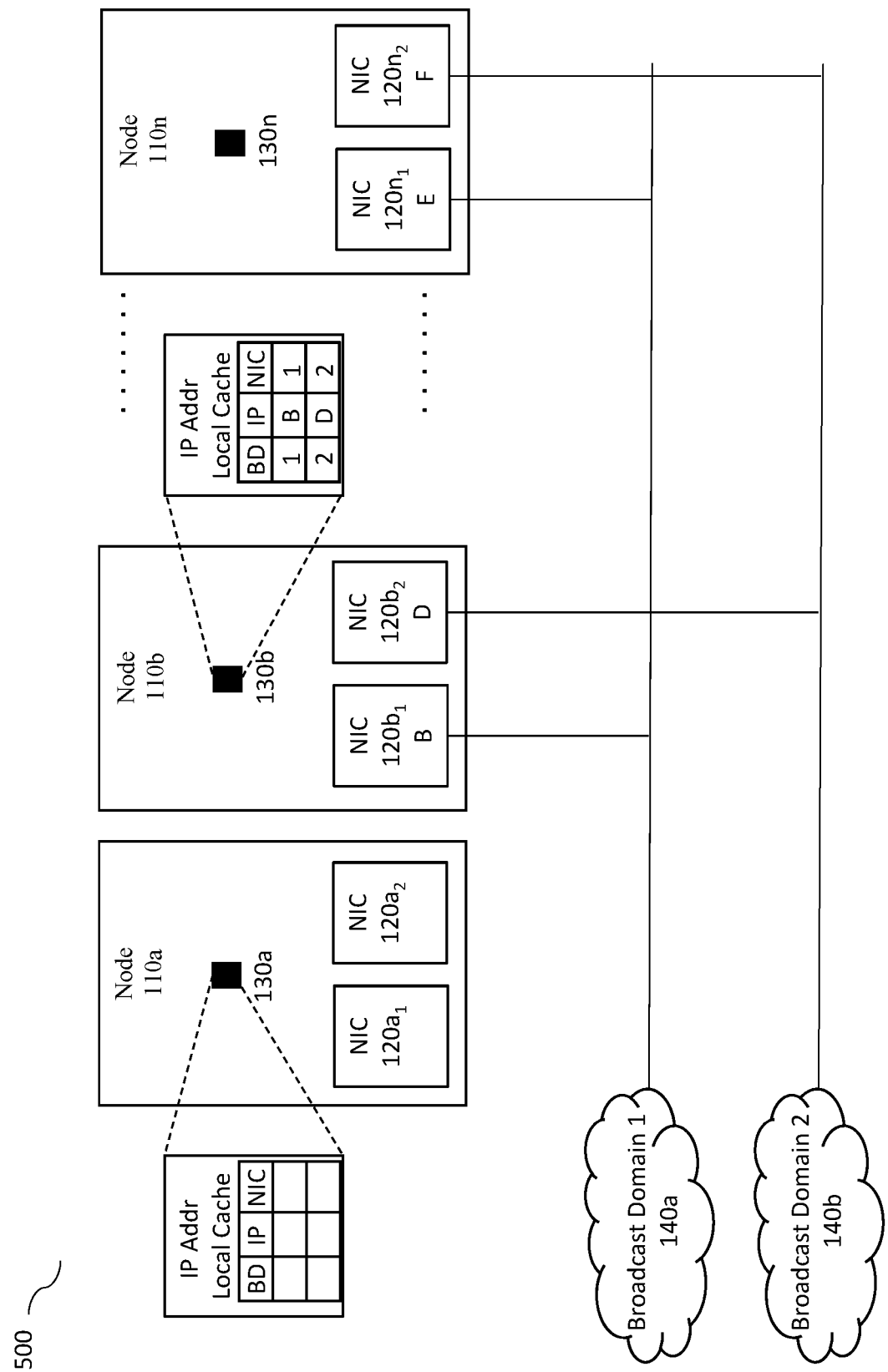

FIGS. 5A-5K provides an illustrative example, according to some embodiments of the present disclosure. FIG. 5A illustrates a computing network system having a plurality of nodes (e.g., node 110b . . . 110n) that are communicatively coupled to respective broadcast domains 140a and 140b via NICs 120. Node 110a is a newly configured node that operates within the computing network system. Each node may have a locally shared data structure 130 that is shared between NICs configured within each of the node.

FIG. 5B illustrates the configuration of communication channels (e.g., at step 210) for each NIC (e.g., NIC $120a_1$ and $120a_2$) of node 110a. In this particular embodiment, each communication channel may include a send socket and a receive socket (not shown in the figures). The send socket provides the communication channel for node 110a to send/broadcast ARP messages such as ARP requests/probe/announcement/defense messages to other nodes connected to the broadcast domains. For example, NIC $120a_1$ may send ARP messages from node 110a to other nodes (e.g., node 110b . . . node 110n) on broadcast domain 1 140a. Additionally, NIC $120a_1$ may receive ARP messages sent from other nodes on broadcast domain 1 140a. NIC $120a_2$ may send ARP messages from node 110a to other nodes (e.g., node 110b . . . node 110n) on broadcast domain 2 140b.

Figure 5C:
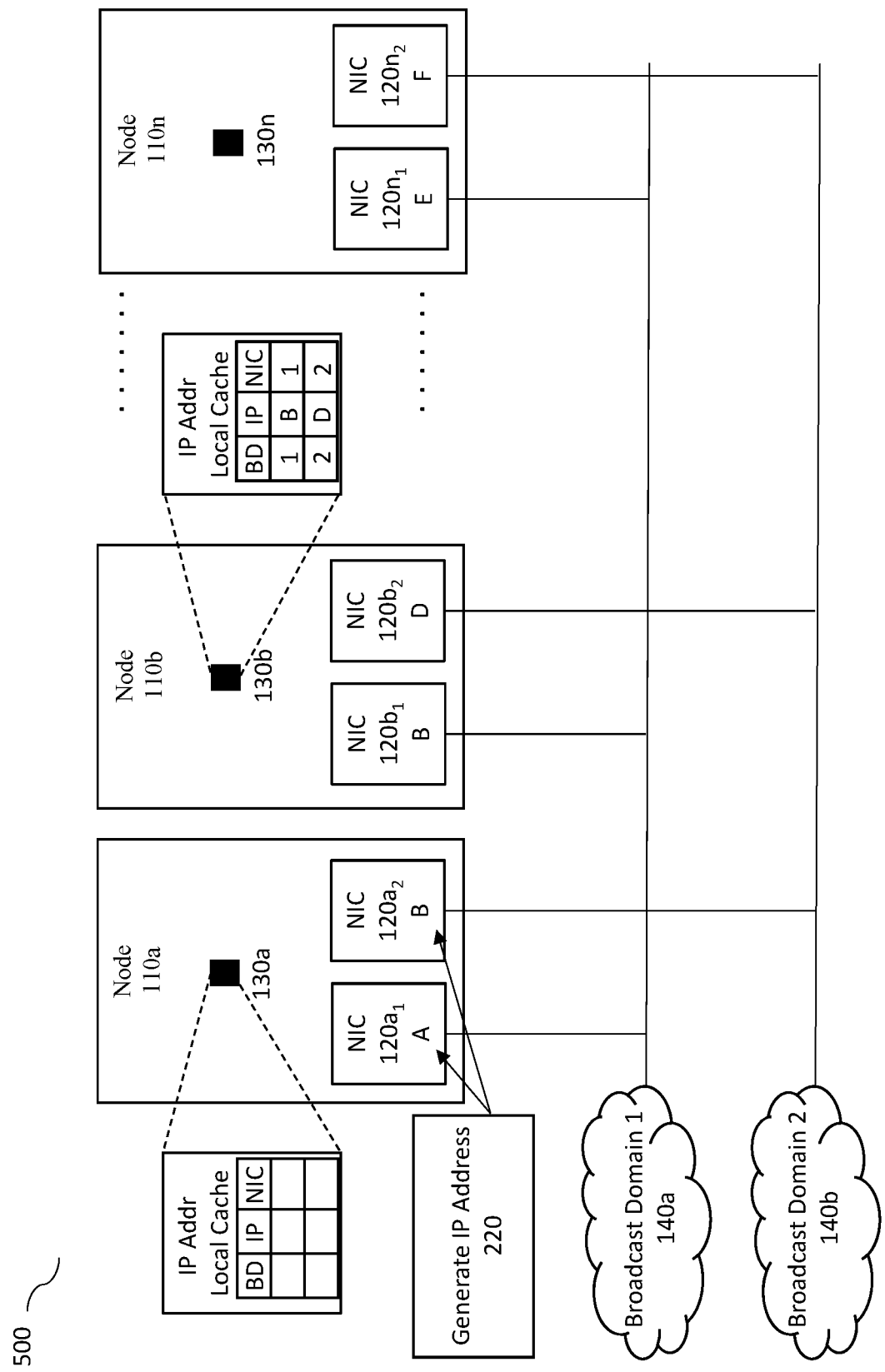
Figure 5D:
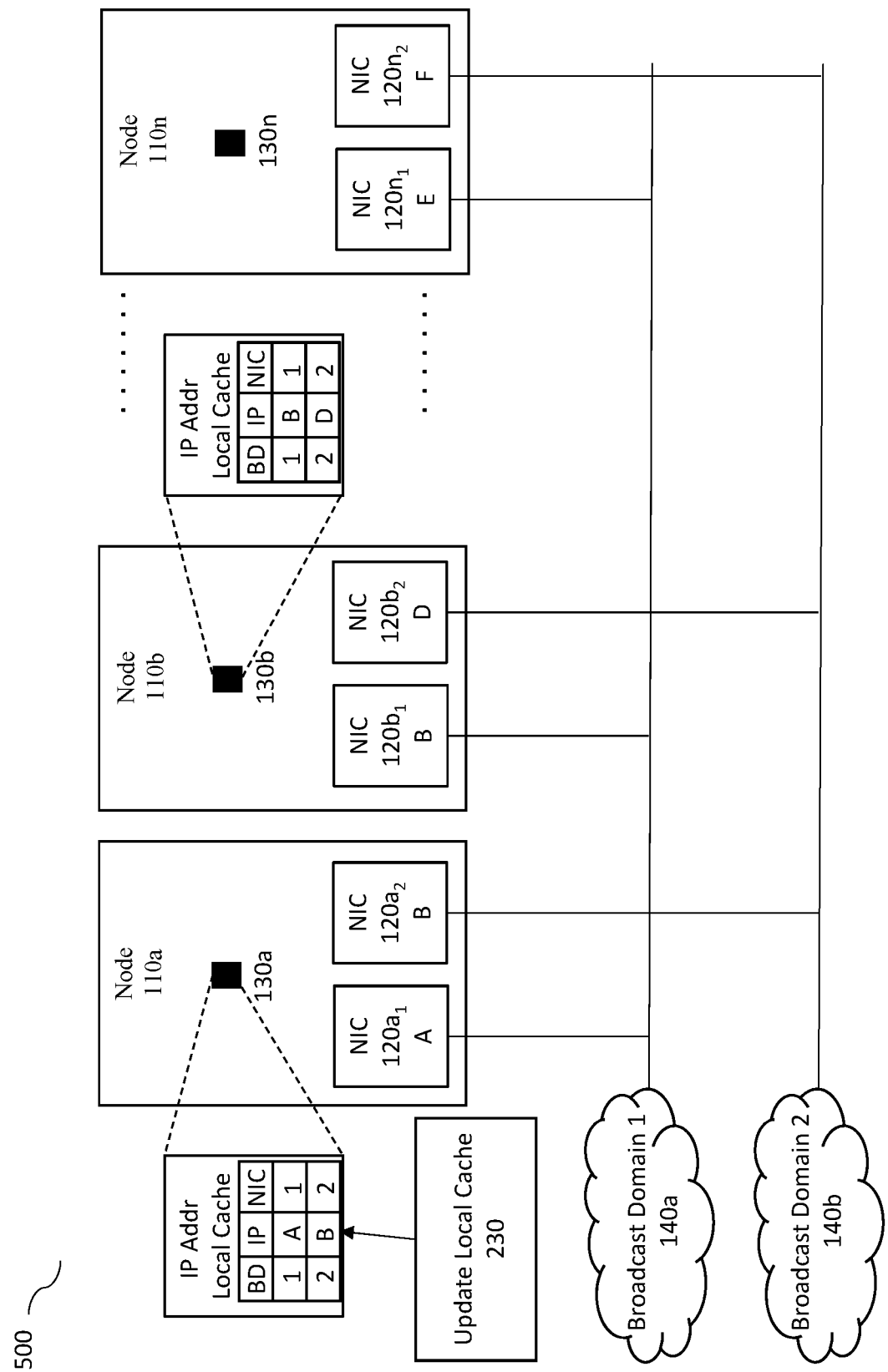

FIG. 5C illustrates that IP address "A" may be generated for and assigned to NIC $120a_1$. IP address "B" may be generated for and assigned to NIC $120a_2$ (e.g., at step 220). IP addresses may be generated by any means available for generating IP addresses. FIG. 5D illustrates that the IP addresses generated on node 110a may be stored (e.g., at step 230) in the locally shared data structure 130. As discussed above, the locally shared data structure 130 is shared between the NICs 120a configured on node 110a so that each NIC 120a on node 110a may cross reference the locally shared data structure 130 when an ARP message is received from other any node across the multiple broadcast domain.

Figure 5E:
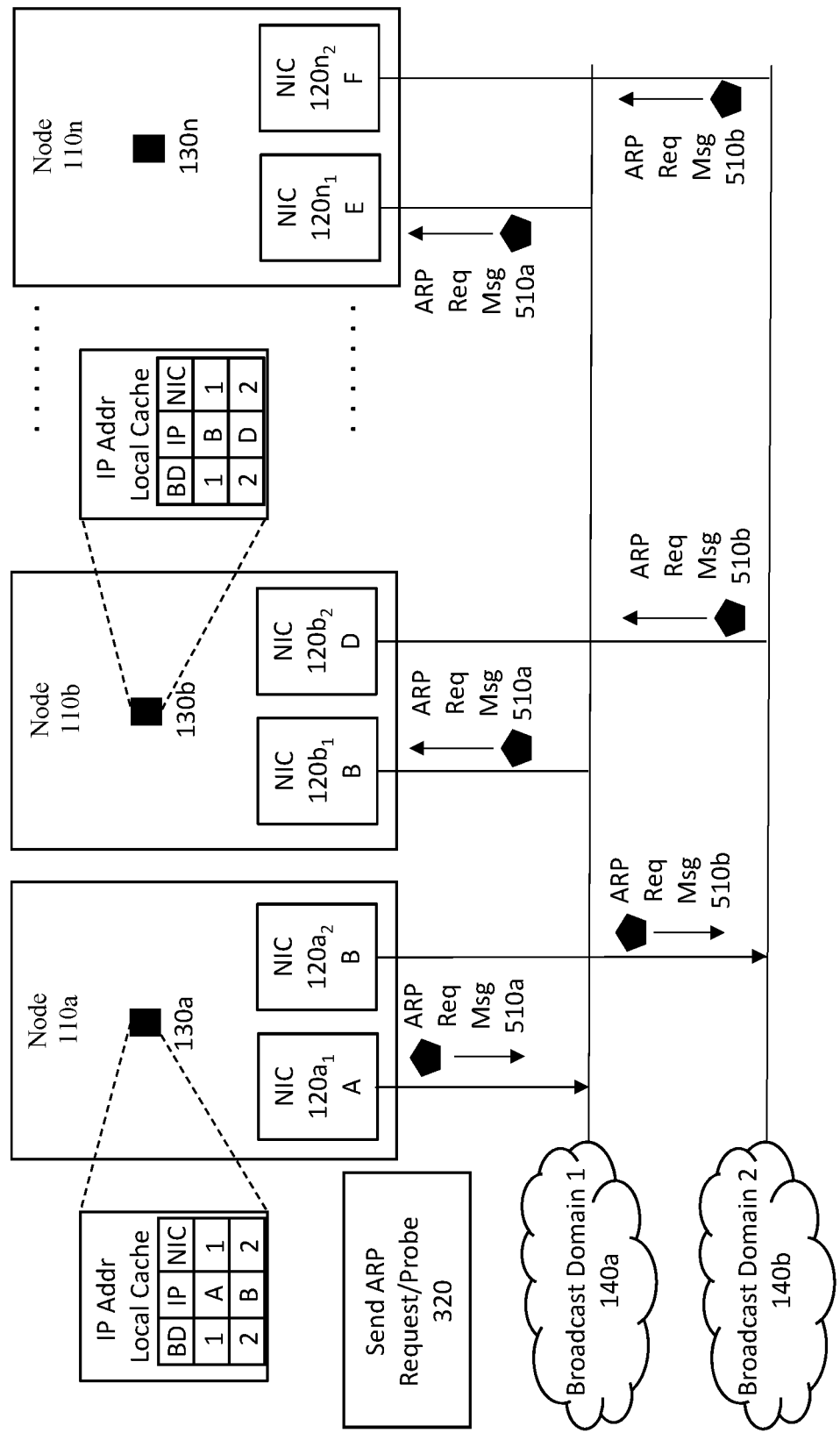

FIG. 5E illustrates that ARP request/probe/announcement broadcast messages 510 may be sent out by each NIC $120a_1$ and $120a_2$ to other nodes within their respective broadcast domain. For example, NIC $120a_1$ sends out ARP request/probe/announcement broadcast messages 510a for IP address "A" on broadcast domain 1 140a and NIC $120a_2$ sends out ARP request/probe/announcement broadcast messages 510b for IP address "B" on broadcast domain 2 140b.

Figure 5F:
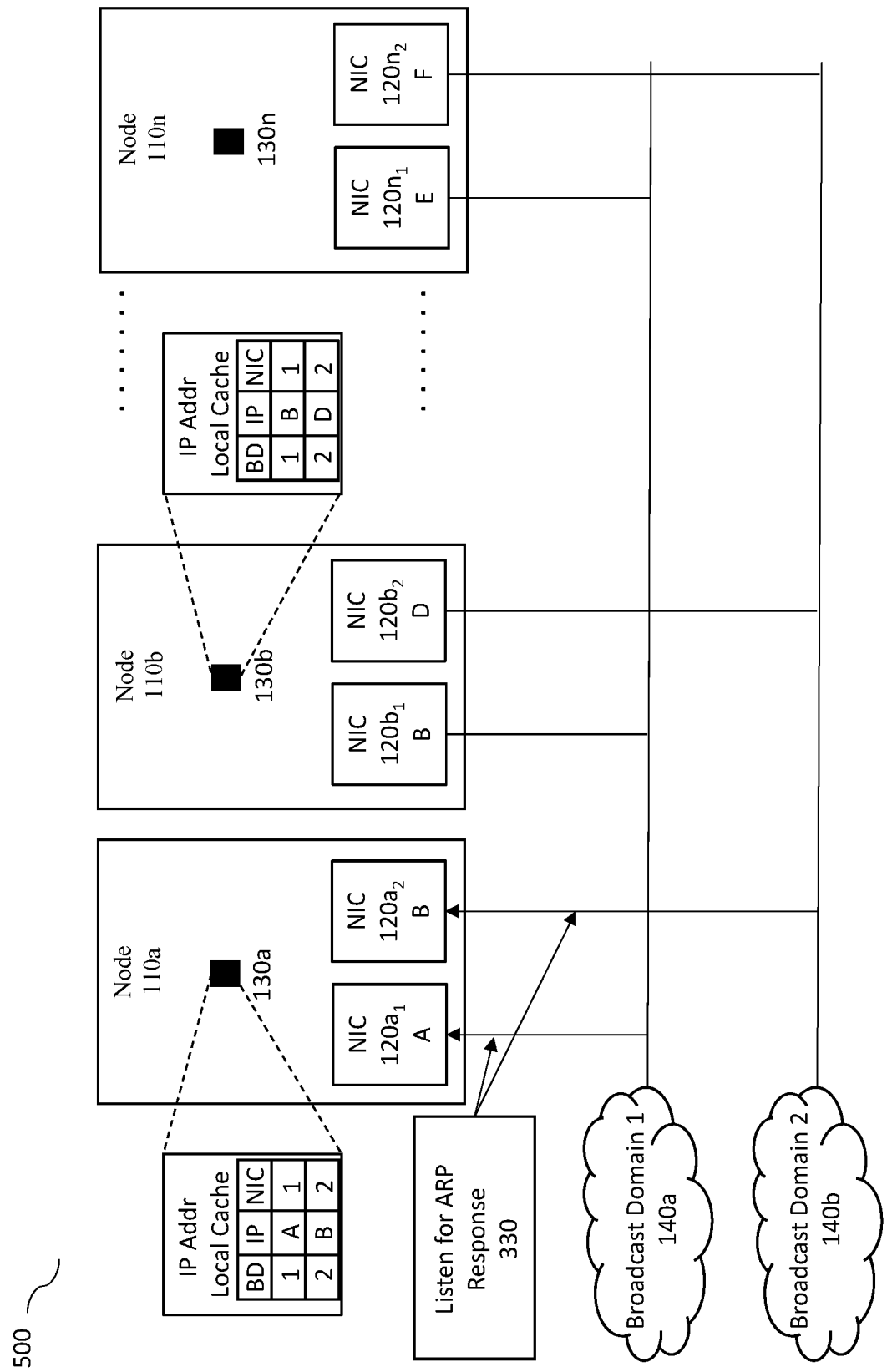

FIG. 5F illustrates that ARP Responses may be constantly monitored or listened for at step 330. As discussed above, ARP Responses may be ARP Reply or ARP Defense messages. If there is a conflict, then the ARP Reply messages may be provided to indicate the existence of the conflict between the newly generated IP and a received IP address of a computing device within the computing network system that is already using the newly generated IP on the same broadcast domain. In the current example, it can be seen that the new request for address B for NIC $120_{a2}$ in Node 110a is in conflict with NIC $120_{b1}$ in Node 110b, since NIC $120_{b1}$ has a previously existing ownership of address B. Using the techniques described in more detail below, this situation is identifiable as a conflict even through NIC $120_{a2}$ is on Broadcast Domain 2 and NIC $120_{b1}$ is on Broadcast Domain 1. Once a conflict has been identified, which has occurred in the current scenario, a new IP address should be generated for any new NIC that may have an IP address conflict with another computing device.

ARP Defense messages may be received from other computing devices within the computing network system, and as discussed above, ARP Defense broadcast messages may be sent out periodically by each computing devices within the computing network system that has already been assigned and confirmed an IP address. The ARP Defense broadcast messages, within the standard ARP/ACD protocol, provide the computing network system the ability to continually monitor and confirm that an IP address assigned to a particular computing device within a particular broadcast domain of the computing network system is unique. However, the present disclosure leverages the ARP Defense broadcast messages sent by computing devices within a particular broadcast domain to determine if the IP address received at a particular node from an ARP Defense broadcast message is also being used by another NIC/computing device on the particular node by cross referencing the locally shared data structure 130 within the particular node. This way, the standard ARP/ACD protocol may be further extended to provide IP address duplication detection across multiple broadcast domains, as discussed further below in FIG. 5G.

Figure 5G:
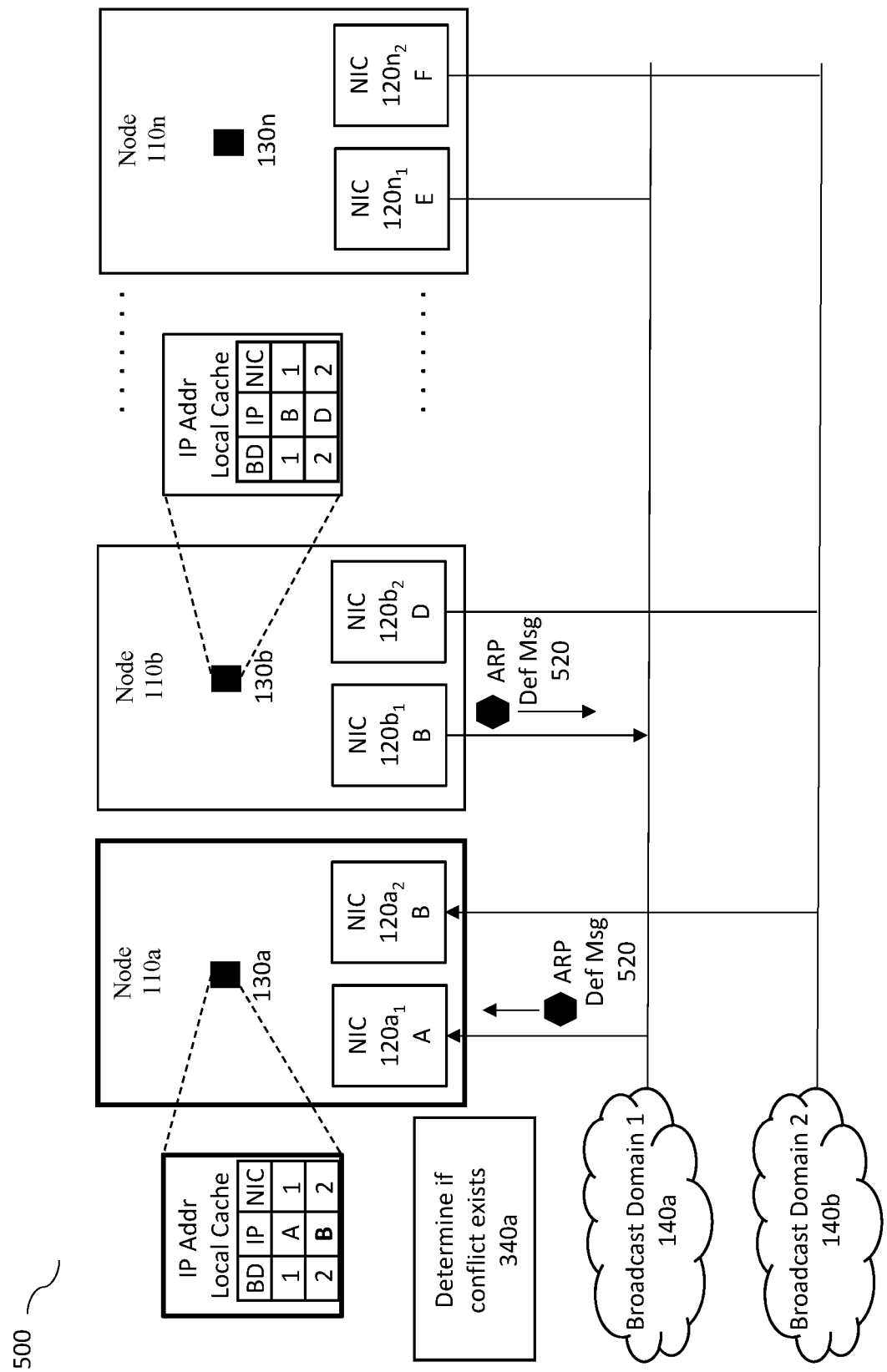

FIG. 5G illustrates an embodiment where a determination of whether of conflict exists is processed by the same node that sent out the ARP request/probe/announcement broadcast messages 510 to determine whether newly generated IP addresses are duplicated on any other computing device within the computing network system that has multiple broadcast domains. As shown, a determination is made as to whether there are any conflicts with IP address "A" or "B" within the computing network system. With respect to conventional ARP Reply messages in response to the ARP request/probe/announcement broadcast messages that would be sent out by node 110a, no ARP Reply messages will be received in response to the ARP request/probe/announcement broadcast messages sent out by either NIC $120a_1$ or NIC $120a_2$. This is because IP address "A" is unique within the broadcast domain 1 140a and IP address "B" is unique within the broadcast domain 2 140b. Since IP address "A" and IP address "B" are unique within their respective broadcast domain 1 140a and broadcast domain 2 140b, respectively, none of the other nodes will send back ARP Reply messages, following standard conventional ARP/ACD protocols.

However, with the current embodiment and with respect to ARP Defense messages received from other computing devices within the computing network system that has multiple broadcast domains, node 110a may be able to determine that there is a conflict by cross referencing IP addresses received within the ARP Defense messages 520 received by node 110a. For example, as discussed above, according to standard ARP/ACD protocols, all computing devices within the computing network system periodically broadcast ARP Defense messages to other nodes within their respective broadcast domains to ensure each of their own IP addresses are being defended so that new computing devices being configured on respective broadcast domains may receive the ARP Defense messages to know whether or not their newly assigned IP addresses configured to new computing devices on the computing network system is unique. For example, FIG. 5G shows that node 110b is broadcasting ARP Defense message 520 for IP address "B" assigned to NIC $120b_1$ on broadcast domain 1 140a. Since NIC $120a_1$ is constantly listening/monitoring for ARP messages sent on broadcast domain 1 140a, node 110a is able to determine whether there are any IP addresses within node 110a that conflicts the IP address identified within the ARP Defense message 520. Node 110a may query its own locally shared data structure 130a to make this determination. As shown in FIG. 5G, node 110a is able to determine that a conflict exists with IP address "B" even though IP address "B" is configured for NIC $120a_2$ on broadcast domain 1 140a for node 110a while IP address "B" is configured for NIC $120b_1$ on broadcast domain 2 140b for node 110b.

By leveraging the existing ARP/ACD protocol, the present embodiment of FIG. 5G only has to modify the existing ARP/ACD protocol at the node that is configuring the new IP address to cross reference IP addresses identified from ARP Defense messages received from other nodes against IP addresses stored in its locally shared data structure 103a to detect IP address duplication across multiple broadcast domains. This is because since other NICs within node 110a may be configured to communicate with different broadcast domains, any time a node from any of the broadcast domain sends out a broadcast ARP Defense message on its respective broadcast domain, as long as there is a NIC 120a configured within node 110a to listen/receive ARP messages from the respective broadcast domain, node 110a may cross reference the IP address received from the ARP Defense message across its locally shared data structure 130a to determine whether there are any IP address conflicts across multiple broadcast domain. One of ordinary skill in the art may appreciate the embodiment of FIGS. 4A and 5G is one possible solution to the problem while other possible solutions may also exist, as discussed above in conjunction with FIG. 4B.

Figure 5H:
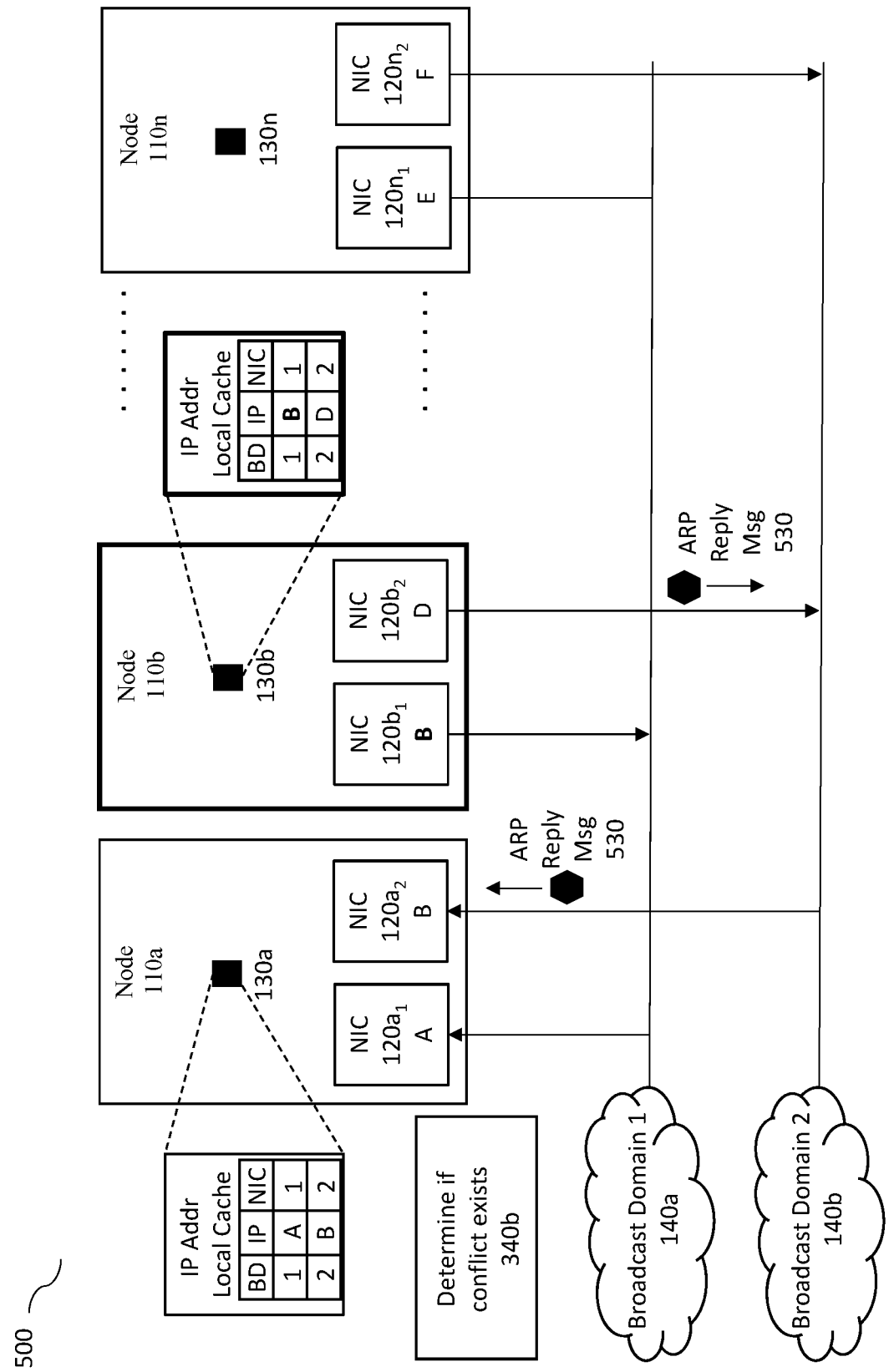

FIG. 5H illustrates an alternative embodiment (as compared to the approach of FIG. 5G) to detect duplicate IP address across multiple broadcast domains, according to some embodiments of the present disclosure. The approach of FIG. 5H differs from the approach of FIG. 5G in that the determination of whether a conflict exists may be made/processed/determined by other nodes of the same broadcast domain, as opposed the approach of FIG. 5G, where the determination of whether an IP address is a duplicate across the multiple broadcast domain may be made by the node that is configuring the new NICs/IP address (e.g., node 110a, NICs 120a). In this approach, the request for an address may be received by another node on a first broadcast domain, but that request is cross-checked against each of the addresses for all domain in that node's local shared storage structure. If there is a match, then the node sends a message back to the requestor indicating the existence of a conflict. In the current example, the request for address B is sent from node 110a on broadcast domain 2, which is received at node 110b from that same broadcast domain. In this example, the existing address for broadcast domain 2 at node 110b is address D, and thus no conflict is exists if only the same broadcast domain 2 is considered. However, with this current embodiment, node 110b will cross-check the request for address B from node 110a against all of the addresses within node 110b's shared data structure 130b to check for a possible conflict. In the current situation, such a conflict is identified since data structure 130b contains an entry for address B corresponding to NIC $120_{b1}$. Even though this NIC is on a different broadcast domain (broadcast domain 1) from the original request (broadcast domain 2), this conflict can now be identified by node 110b. This approach of FIG. 5H is useful, for example, if it is decided to reduce the number of listeners at the node 110a, thereby permitting the address conflict to be detected even though node 110a does not perform listening on both broadcast domains.

By way of illustration, consider when NIC $120a_2$ sent, via broadcast, the ARP request/probe/announcement message 510b, it was NIC $120b_2$ on node 110b that received the ARP request/probe/announcement broadcast message 510b. As illustrated in FIG. 5H, once node 110b received the ARP request/probe/announcement broadcast message 510b, node 110b may identify the IP address within the message 510b as "B". Node 110b may query its locally shared data structure 130b to determine whether or not a conflict exists between IP address "B" identified in the message 510b and any other IP addresses stored within its locally shared data structure 130b. As it turns out, NIC $120b_1$ on node 110b is already configured to use IP address "B". Since, node 110b has determined that a conflict does exist, node 110b may send out an ARP Reply message 530 to node 110a to inform node 110a that IP address "B" is already being used by a computing device/NIC $120b_1$. In this embodiment, it is the other nodes that are listening for ARP messages to defend its own IP addresses across the multiple broadcast domains.

By leveraging the existing ARP/ACD protocol, the embodiment of FIG. 5H only has to modify the existing ARP/ACD protocol for listening/monitoring ARP request/probe/announcement messages 510 sent from other nodes within a broadcast domain to cross reference IP addresses identified from the ARP request/probe/announcement messages 510 against IP addresses stored in its respective locally shared data structures 103 to detect IP address duplication across multiple broadcast domains. The detection of the duplicate IP address across multiple broadcast domain, according to the present embodiment, is possible because since different NICs are configured within a particular node may be communicatively coupled to different broadcast domains, whenever a NIC from a particular broadcast domain receives an ARP request/probe/announcement message 510, the particular node may cross reference the IP address identified within the message 510 across its own locally shared data structure 130 to determine whether any of its IP addresses, configured on NICs connected to either the same or different broadcast domains, conflicts with the IP address identified within the received message 510. The IP address identified within the received message 510 corresponds to another computing device within the computing network system trying to use the conflicting IP address for the other computing device. By having each node cross reference its respective locally shared data structure 130 upon receiving any ARP request/probe/announcement messages 510, the present embodiment may be able to quickly notify the node requesting to use the IP address of the potential conflict.

Figure 5I:
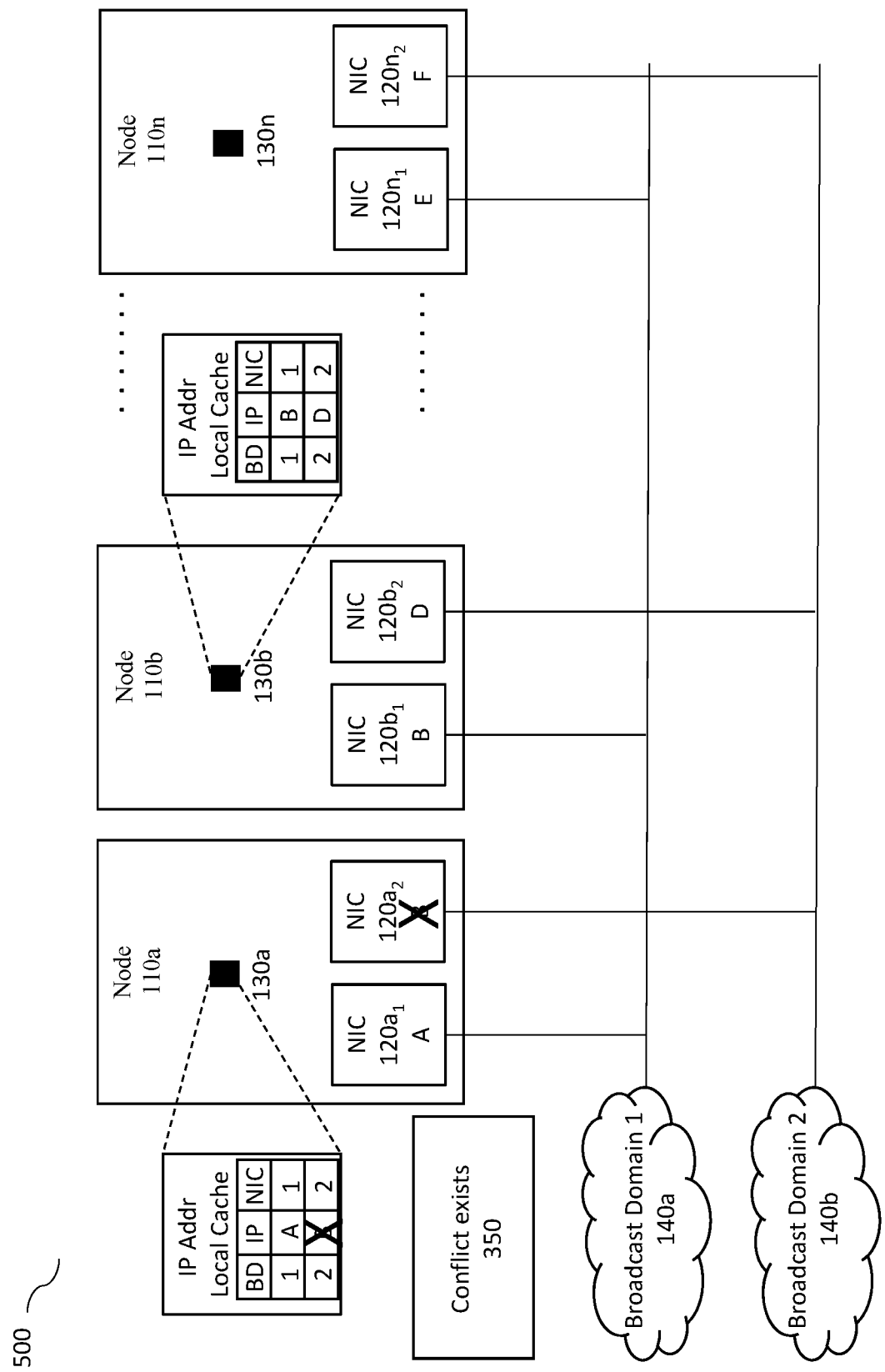

FIG. 5I illustrates that a conflict in IP address is confirmed by the node requesting to use the newly generated IP address, according to some embodiments of the present disclosures. At step 350, node 110a confirms that a conflict does exist. The confirmation may be a result of the embodiment, of FIG. 5G, where another node, such as node 110b, sends an ARP Defense message 520 from NIC $120b_1$ on broadcast domain 1 140a The ARP Defense message 520 is received by NIC $120a_1$. The ARP Defense message 520 may include the IP address "B" that is currently being used by NIC $120b_1$ on broadcast domain 1 140a. Although IP address "B" is configured to NIC $120a_1$ to communicate on broadcast domain 2 140b is unique on broadcast domain 2 140b, it is nevertheless a duplicate IP address across the multiple broadcast domains of the computing network system. Once NIC $120a_1$ receives the ARP Defense message 520, node 110a may identify the IP address "B" that is being defended by node 110b from within the ARP Defense message 520. A quick check of the local shared data structure 130a by node 110a may confirm that IP address "B"

received from ARP Defense message 520 is indeed a duplicate IP address that is already being used by another computing device within the multiple broadcast domains of the computing network system. The confirmation may also be the result of the embodiment of FIG. 5H, where node 110a receives an ARP Reply message 530 from NIC 120$b_2$ of node 110b on broadcast domain 2 140b that is received by NIC 120$a_2$. The ARP Reply message 530 comprising the IP address "B" that is currently being used by NIC 120$b_1$ on broadcast domain 1 140a. Although IP address "B" is configured to NIC 120$a_1$ to communicate on broadcast domain 2 140b is unique on broadcast domain 2 140b, IP address "B" is nevertheless a duplicate IP address across the multiple broadcast domains of the computing network system. Once NIC 120$a_2$ receives the ARP Reply message 530, node 110a may identify the IP address "B" that is being defended by node 110b from within the ARP Reply message 530. A quick check of the local shared data structure 130a by node 110a may confirm that IP address "B" received from ARP Reply message 530 is indeed a duplicate IP address that is already being used by another computing device within the multiple broadcast domains of the computing network system.

Figure 5J:
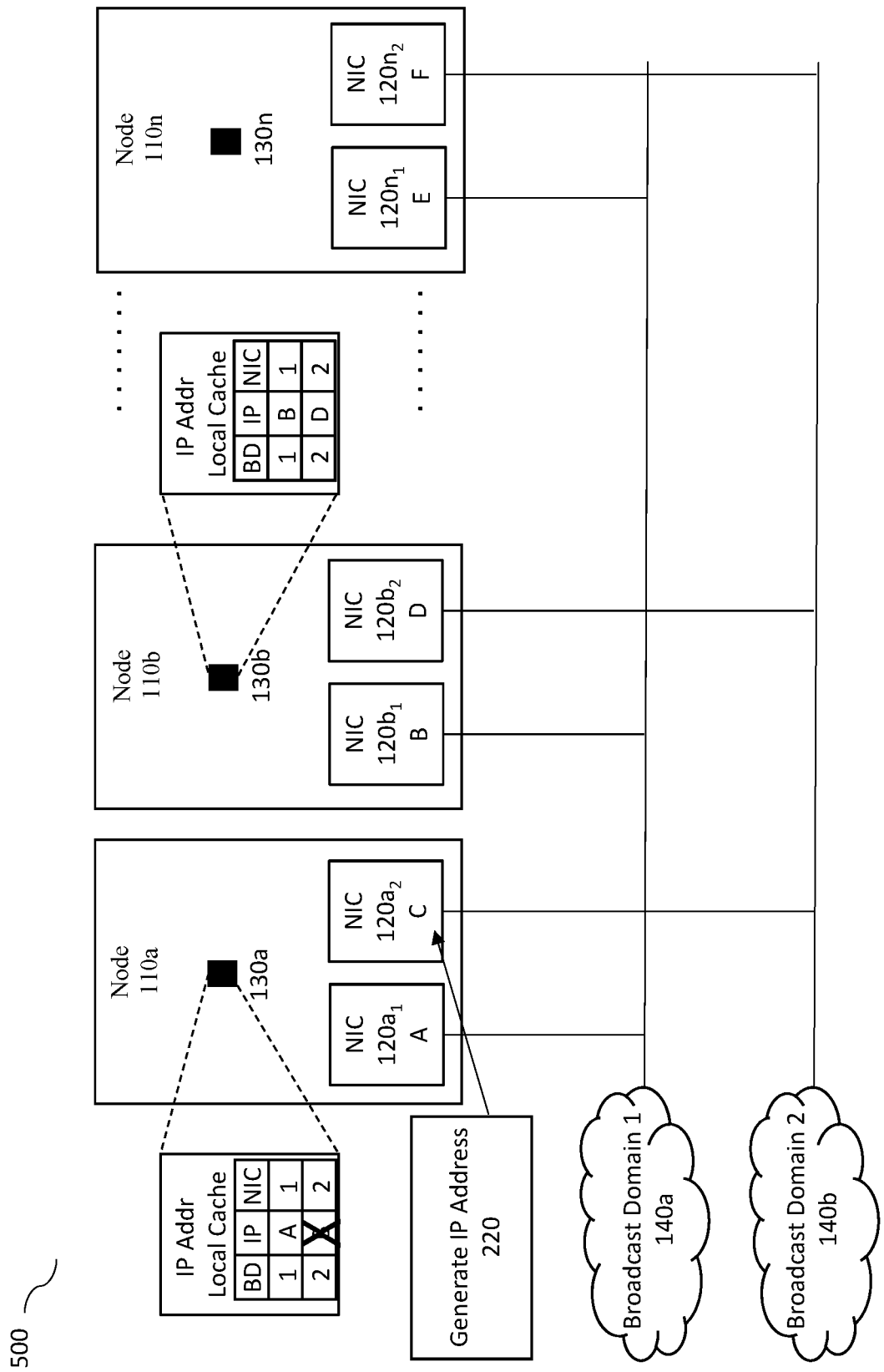
Figure 5K:
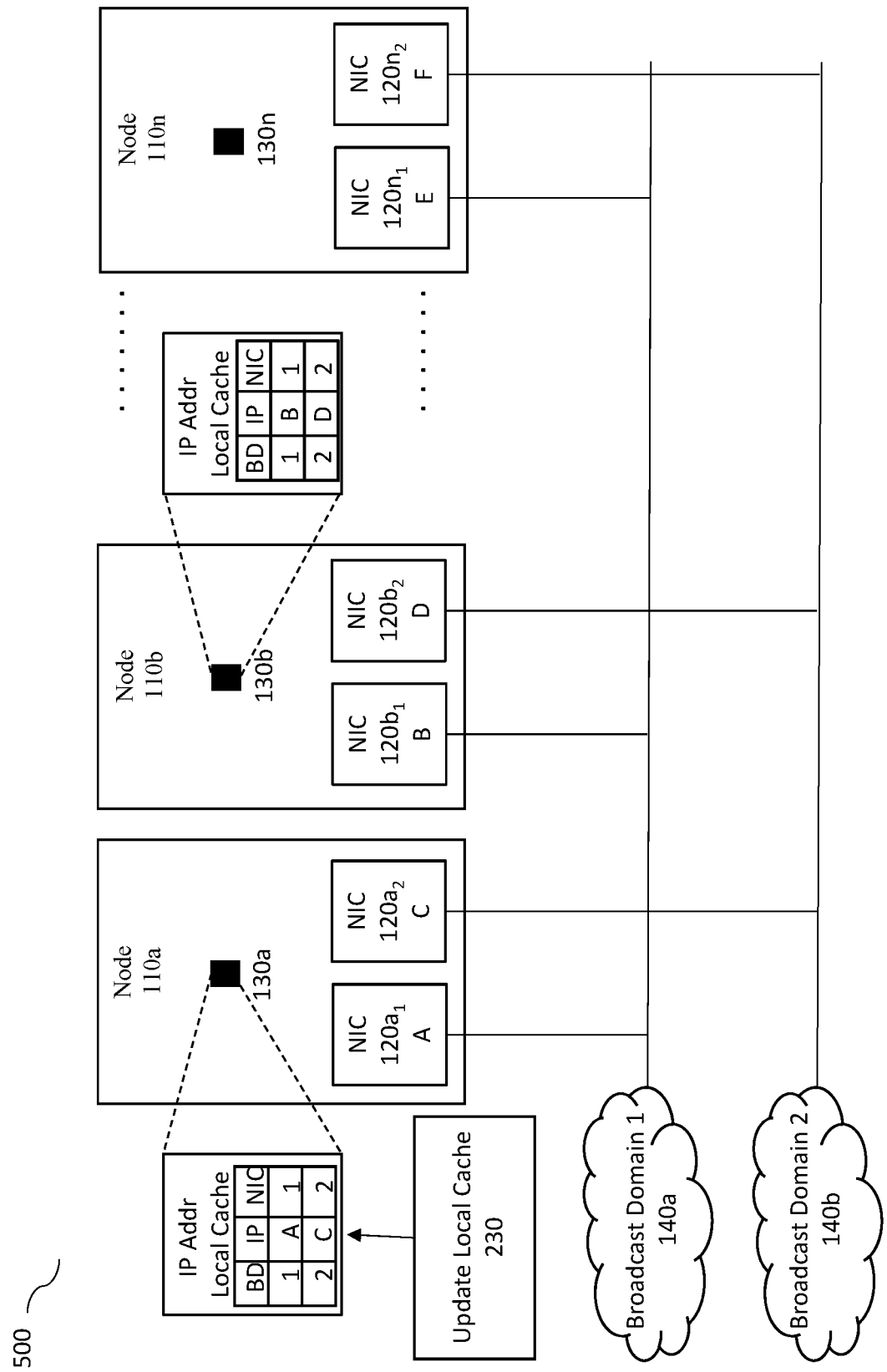

FIG. 5J illustrates that a new IP address may be generated for the computing device being configured with the conflicting IP address. As depicted by step 220, a new IP address "C" may be generated for NIC 120$a_2$ so that node 110a may start the process again to confirm that the newly generated IP address "C" is unique across computing devices spanning across multiple broadcast domains of the computing network system. FIG. 5K illustrates that the newly generated IP address "C" is updated in the locally shared data structure 130a of node 110a. Processing then repeats, e.g., from FIGS. 5E-5I, until it is determined that no conflict exists for the newly generated IP address "C". As depicted in FIG. 5K, no other nodes within the computing network system shows any other NICs 120 are configured with an IP address of "C". Therefore, since IP address of "C" is unique within the computing network system, IP address "C" may be used by NIC 120$a_2$ of node 110a.

Therefore, what has been described is an improved approach to detect conflicts for the assignment of addresses in a computing system. In particular, what has been described is an improved approach to implement identification of address conflicts across multiple broadcast domains in a computing system.

System Architecture Overview

Figure 6:
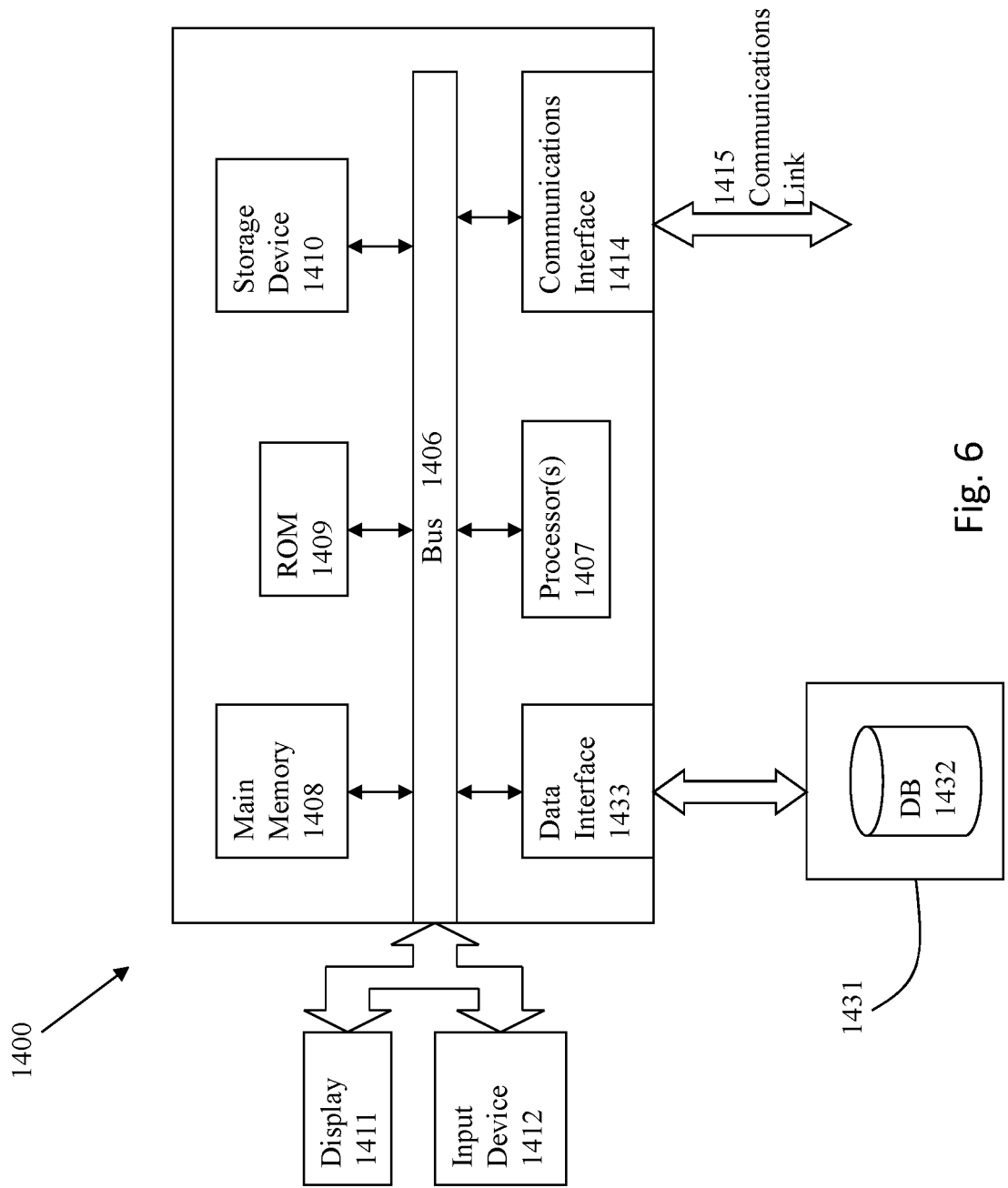
FIG. 6 is a block diagram of an illustrative computing system suitable for implementing an embodiment of the present disclosure.

FIG. 6 is a block diagram of an illustrative computing system 1000 suitable for implementing an embodiment of the present disclosure. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), data interface 1033, and cursor control.

According to some embodiments of the disclosure, computer system 1000 performs specific operations by processor 1007 executing one or more sequences of one or more instructions contained in system memory 1008. Such instructions may be read into system memory 1008 from another computer readable/usable medium, such as static storage device 1009 or disk drive 1010. In alternative embodiments, hard-wired circuitry may be used in place of or in combination with software instructions to implement the disclosure. Thus, embodiments of the disclosure are not limited to any specific combination of hardware circuitry and/or software. In some embodiments, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 1000. According to other embodiments of the disclosure, two or more computer systems 1000 coupled by communication link 1010 (e.g., LAN, PTSN, or wireless network) may perform the sequence of instructions required to practice the disclosure in coordination with one another.

Computer system 1000 may transmit and receive messages, data, and instructions, including program, e.g., application code, through communication link 1015 and communication interface 1014. Received program code may be executed by processor 1007 as it is received, and/or stored in disk drive 1010, or other non-volatile storage for later execution. A database 1032 in a storage medium 1031 may be used to store data accessible by the system 1000 via data interface 1033.

Figure 7:
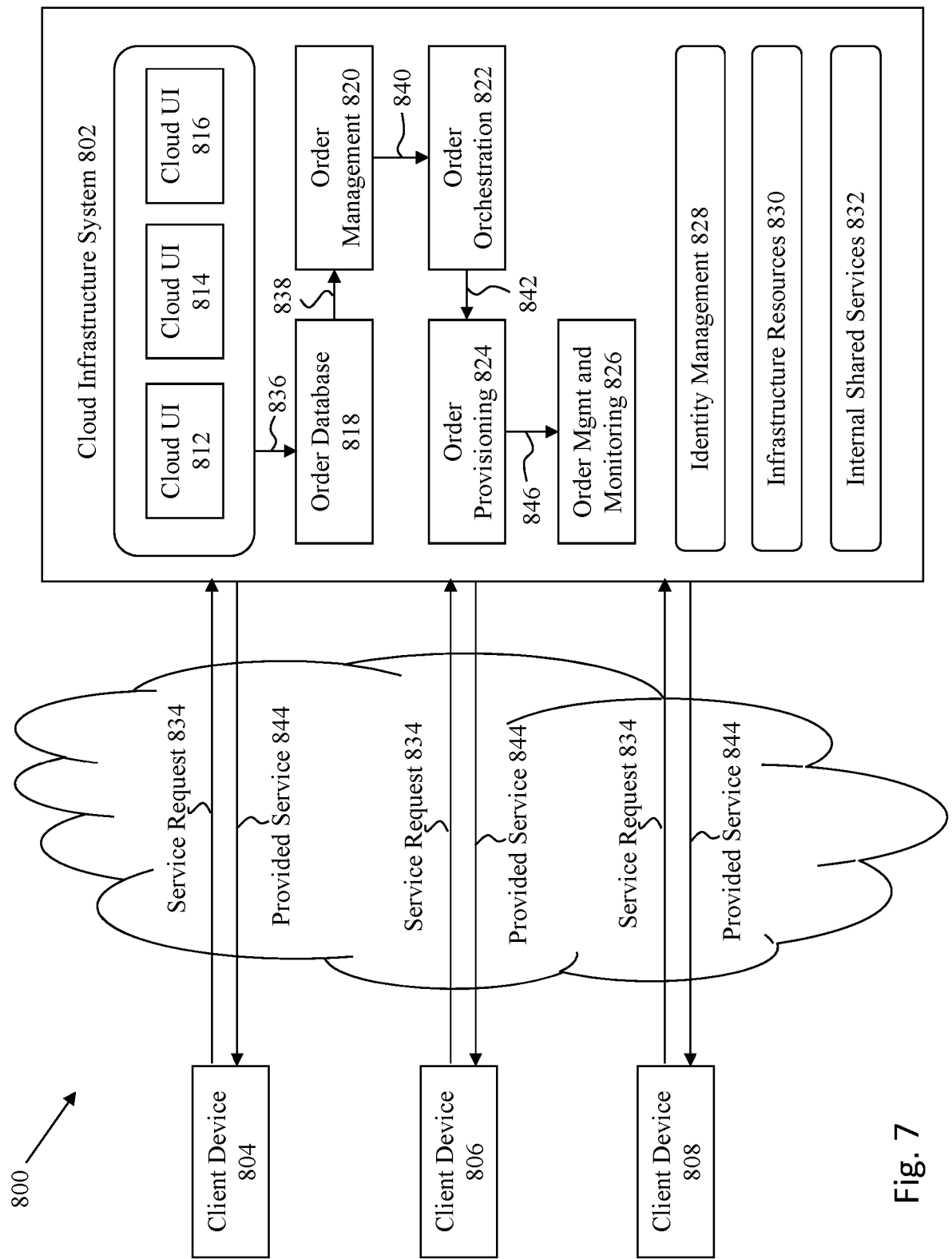
FIG. 7 is a block diagram of one or more components of a system environment by which services provided by one or more components of an embodiment system may be offered as cloud services, in accordance with an embodiment of the present disclosure.

FIG. 7 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the disclosure. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 6. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that allow organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that allow organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may allow a first set of users in a first time zone to utilize resources of the cloud infrastructure system for a specified number of hours and then allow the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 allows the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 allows the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer-implemented method, comprising:
maintaining a computing system having a plurality of broadcast domains, wherein the plurality of broadcast domains comprises first and second broadcast domains;
generating an IP address for a first node in the first broadcast domain;
determining if the IP address is duplicated within the second broadcast domain, wherein a listener listens for a message from the first or second broadcast domains, and the message indicates a conflict for the IP address from a second node;
generating an alternate IP address for the first node if the IP address is duplicated within the second broadcast domain; and
assigning the IP address to the first node if the IP address is not duplicated within the second broadcast domain.

2. The method of claim 1, wherein the first node comprises a shared data structure that is accessible by a plurality of entities on the first node that accesses the first and second broadcast domains, a first IP address for a first entity and a second IP address for a second entity are stored in the shared data structure, and the shared data structure is accessed to determine whether the IP address is duplicated within the second broadcast domain.

3. The method of claim 2, wherein the first entity comprises a first process or thread that is associated with a first network interface card (NIC), the second entity comprises a second process or thread that is associated with a second NIC, the first IP address is assigned to the first NIC, and the second IP address is assigned to the first NIC.

4. The method of claim 3, wherein the shared data structure is maintained within a shared memory region accessible by the first and second processes or threads.

5. The method of claim 1, wherein the first and second broadcast domain comprise a plurality of listeners to listen for messages on the first or second broadcast domains, and the messages indicate a conflict for the IP address from the first or second nodes.

6. The method of claim 5, wherein the message comprises a broadcast message from the second node that identifies the IP address as being associated with a communications mechanism on the second node.

7. The method of claim 1, wherein the second node receives a message from the first node regarding the IP address being generated for the first node in the first broadcast domain, and the second node cross-checks the IP address within a shared data structure at the second node to identify whether the IP address is assigned to an entity at the second node associated with the second broadcast domain.

8. A computer program product embodied on a computer readable medium, the computer readable medium having stored thereon a sequence of instructions which, when executed by a processor, executes:
maintaining a computing system having a plurality of broadcast domains, wherein the plurality of broadcast domains comprises first and second broadcast domains;
generating an IP address for a first node in the first broadcast domain;
determining if the IP address is duplicated within the second broadcast domain, wherein a listener listens for a message from the first or second broadcast domains, and the message indicates a conflict for the IP address from a second node;
generating an alternate IP address for the first node if the IP address is duplicated within the second broadcast domain; and
assigning the IP address to the first node if the IP address is not duplicated within the second broadcast domain.

9. The computer program product of claim 8, wherein the first node comprises a shared data structure that is accessible by a plurality of entities on the first node that accesses the first and second broadcast domains, a first IP address for a first entity and a second IP address for a second entity are stored in the shared data structure, and the shared data structure is accessible to determine whether the IP address is duplicated within the second broadcast domain.

10. The computer program product of claim 9, wherein the first entity comprises a first process or thread that is associated with a first network interface card (NIC), the second entity comprises a second process or thread that is associated with a second NIC, the first IP address is assigned to the first NIC, and the second IP address is assigned to the first NIC.

11. The computer program product of claim 10, wherein the shared data structure is maintained within a shared memory region accessible by the first and second processes or threads.

12. The computer program product of claim 8, wherein the first and second broadcast domain comprise a plurality of listeners to listen for messages on the first or second broadcast domains, and the messages indicate a conflict for the IP address from the first or second nodes.

13. The computer program product of claim 12, wherein the message comprises a broadcast message from the second node that identifies the IP address as being associated with a communications mechanism on the second node.

14. The computer program product of claim 8, wherein the second node receives a message from the first node regarding the IP address being generated for the first node in the first broadcast domain, and the second node cross-checks the IP address within a shared data structure at the second node to identify whether the IP address is assigned to an entity at the second node associated with the second broadcast domain.

15. A system, comprising:
a processor;
a memory for holding programmable code; and
wherein the programmable code includes instructions for
maintaining a computing system having a plurality of broadcast domains, wherein the plurality of broadcast domains comprises first and second broadcast domains;
generating an IP address for a first node in the first broadcast domain;
determining if the IP address is duplicated within the second broadcast domain, wherein a listener listens for a message from the first or second broadcast domains, and the message indicates a conflict for the IP address from a second node;

generating an alternate IP address for the first node if the IP address is duplicated within the second broadcast domain; and assigning the IP address to the first node if the IP address is not duplicated within the second broadcast domain.

16. The system of claim 15, wherein the first node comprises a shared data structure that is accessible by a plurality of entities on the first node that accesses the first and second broadcast domains, a first IP address for a first entity and a second IP address for a second entity are stored in the shared data structure, and the shared data structure is accessed to determine whether the IP address is duplicated within the second broadcast domain.

17. The system of claim 16, wherein the first entity comprises a first process or thread that is associated with a first network interface card (NIC), the second entity comprises a second process or thread that is associated with a second NIC, the first IP address is assigned to the first NIC, and the second IP address is assigned to the first NIC.

18. The system of claim 17, wherein the shared data structure is maintained within a shared memory region accessible by the first and second processes or threads.

19. The system of claim 15, wherein the first and second broadcast domain comprise a plurality of listeners to listen for messages on the first or second broadcast domains, and the messages indicate a conflict for the IP address from the first or second nodes.

20. The system of claim 19, wherein the message comprises a broadcast message from the second node that identifies the IP address as being associated with a communications mechanism on the second node.

21. The system of claim 15, wherein the second node receives a message from the first node regarding the IP address being generated for the first node in the first broadcast domain, and the second node cross-checks the IP address within a shared data structure at the second node to identify whether the IP address is assigned to an entity at the second node associated with the second broadcast domain.

* * * * *